US005825232A

United States Patent [19]

Kimura

[11] Patent Number: 5,825,232

[45] Date of Patent: Oct. 20, 1998

[54] MOS FOUR-QUADRANT MULTIPLIER INCLUDING THE VOLTAGE-CONTROLLED-THREE-TRANSISTOR V-I CONVERTERS

[75] Inventor: Katsuji Kimura, Tokyo, Japan

[73] Assignee: NEC Corporation, Tokyo, Japan

[21] Appl. No.: 857,819

[22] Filed: May 16, 1997

Related U.S. Application Data

[63] Continuation of Ser. No. 488,412, Jun. 7, 1995, abandoned.

[30] Foreign Application Priority Data

| | | | |
|---|---|---|---|
| Jun. 13, 1994 | [JP] | Japan | 6-130469 |
| Jun. 13, 1994 | [JP] | Japan | 6-130470 |
| Jun. 13, 1994 | [JP] | Japan | 6-130471 |
| Dec. 6, 1994 | [JP] | Japan | 6-301991 |

[51] Int. Cl.[6] .......... G06F 7/44

[52] U.S. Cl. .......... 327/356; 327/359; 327/560; 327/563

[58] Field of Search .......... 327/356, 357, 327/358, 359, 560, 563

[56] References Cited

U.S. PATENT DOCUMENTS

| | | | |
|---|---|---|---|
| 3,689,752 | 9/1972 | Gilbert | 327/357 |
| 5,151,625 | 9/1992 | Zarabadi et al. | 327/356 |
| 5,187,682 | 2/1993 | Kimural | 327/356 |
| 5,396,131 | 3/1995 | Miki et al. | 327/563 |
| 5,438,296 | 8/1995 | Kimura | 327/357 |
| 5,448,772 | 9/1995 | Granfield | 327/357 |

FOREIGN PATENT DOCUMENTS

| | | | |
|---|---|---|---|
| 52-61946 | 5/1977 | Japan | 327/356 |
| 4-343505 | 11/1992 | Japan | 327/357 |

OTHER PUBLICATIONS

"A CMOS Four–Quadrant Analog Multiplier", K. Bult and H. Wallinga, IEEE Journal of Solid State Circuits, vol. SC–21, No. 3, Jun. 1986, pp. 430–435.

*Primary Examiner*—Terry Cunningham

*Attorney, Agent, or Firm*—Sughrue, Mion, Zinn, Macpeak & Seas, PLLC

[57] ABSTRACT

A MOS four-quadrant multiplier for outputting a combined differential output current corresponding to the product of first and second differential input voltages has first and second two-quadrant multipliers each having a differential output. The combined differential output current includes a plurality of differential output currents. First and second two-quadrant multipliers included in the MOS four-quadrant multiplier each have first and second pairs of transistors including sources connected in common to each other. A third pair of transistors is connected in cascode to the first pair of transistors as a load on the first pair of transistors. In each of the two-quadrant multipliers, the second pair of transistors has drains which are not connected in common to drains of the third pair of transistors. The second pair of transistors has gates respectively connected to drains of said first pair of transistors and sources of said third pair of transistors. The third pair of transistors of each of the first and second two-quadrant multipliers have gates connected in common to each other at a node. Each differential output current generated in a corresponding one of the first and second two-quadrant multipliers includes at least a drain current of the second pair of transistors. The differential outputs of the first and second two-quadrant multipliers are connected to each other to output the combined differential output current. The first differential input voltage is applied between the gates of the first pair of transistors, and the second differential input voltage is applied between the node of the first two-quadrant multiplier and the node of the second two-quadrant multiplier.

10 Claims, 12 Drawing Sheets

MOS FOUR-QUADRANT MULTIPLIER INCLUDING THE VOLTAGE-CONTROLLED-THREE-TRANSISTOR V-I CONVERTERS

This is a Continuation Application of U.S. application Ser. No. 08/488,412, filed on Jun. 7, 1995, now abandoned.

BACKGROUND OF THE INVENTION

1. Field of the Invention

The present invention relates to a multiplier for multiplying analog signals, and more particularly to a four-quadrant multiplier composed of MOS (Metal-Oxide-Semiconductor) field-effect transistors on a semiconductor integrated circuit.

2. Description of the Related Art

One known multiplier comprising MOS transistors is revealed by K. Bult and H. Wallinga in IEEE Journal of Solid-State Circuits, Vol. SC-21, No. 3, pp. 430–435, June 1986. K. Bult et al. disclose both a two-quadrant multiplier and a four-quadrant multiplier, the four-quadrant multiplier which are being composed of two-quadrant multipliers coupled to each other.

FIG. 1 of the accompanying drawings shows a MOS four-quadrant multiplier proposed by K. Bult et al. The MOS four-quadrant multiplier shown in FIG. 1 comprises 12 MOS transistors M11 to M14, M21 to M24, and M31 to M34 of equal characteristics which constitute a multiplier core, and 6 MOS transistors M41 to M46 which constitute three current mirrors. MOS transistors M11, M21, M31, M14, M24 and M34 jointly constitute a first two-quadrant multiplier, and MOS transistors M12, M22, M32, M13, M23 and M33 jointly constitute a second two-quadrant multiplier.

In the first two-quadrant multiplier, transistors M11, M14, M31 and M34 have sources connected in common to a negative power supply $V_{SS}$. Transistors M31 and M34 have their drains connected in common, and are connected in series to transistors M21 and M24, respectively. Transistors M11 and M24 have drains connected in common to the drain of transistor M42 of the first current mirror. Transistors M14 and M21 have their drains connected in common to the drain of transistor M43 of the second current mirror. Transistors M11 and M14 have gates connected respectively to the drains of transistors M31 and M34. Input voltages $V_1$, $V_1'$ are applied respectively to the gates of transistors M31 and M34. Transistors M21 and M24 have gates connected to each other with an input voltage $V_2$ applied thereto.

The second two-quadrant multiplier is similar in structure to the first two-quadrant multiplier, but differs therefrom in that an input voltage $V_2'$ is applied to the gates of transistors M22 and M23. The second two-quadrant multiplier is coupled to the first two-quadrant multiplier. Specifically, the drains of transistors M12 and M23 are connected to the drain of transistor M43 of the second current mirror, and the drains of transistors M13 and M22 are connected to the drain of transistor M42 of the first current mirror. The input voltages $V_1$, $V_1'$ produce a first differential input voltage, whereas the input voltages $V_2$, $V_2'$ produce a second differential input voltage.

In the first current mirror, the P-channel MOS transistors M41 and M42 have sources connected in common to a positive power supply $V_{DD}$, and gates connected to the drain of transistor M42. In the second current mirror, the P-channel MOS transistors M43 and M44 have sources connected in common to the positive power supply $V_{DD}$, and gates connected to the drain of transistor M43. In the third current mirror, the N-Channel MOS transistors M45 and M46 have sources connected in common to the negative power supply $V_{SS}$, and gates connected to the drain of transistor M45. The drains of transistors M45 and M46 are connected respectively to the drains of transistors M41 and M44 of the first and second current mirrors. These current mirrors are used to convert a differential output current ΔI to an single-ended output current. A current flowing from a node where the drains of transistors M44 and M46 are connected to each other serves as an output current of the multiplier.

If the channel-length modulation and the body effect are ignored, then the drain current of a MOS transistor which is operating in a saturated region is generally represented by:

$$I_{Di}=\beta(V_{GSi}-V_{TH})^2 \ (V_{GSi}>=V_{TH})$$

$$I_{Di}=0 \ (V_{GSi}<=V_{TH}) \quad (1)$$

where β is a transconductance parameter expressed by $\beta=\mu(C_{OX}/2)(W/L)$ where $\mu$ is the effective mobility of the carrier, $C_{OX}$ is the gate oxide film capacity per unit area, and W and L a gate width and a gate length, respectively, $V_{TH}$ the threshold voltage, and $V_{GSi}$ the gate-to-source voltage of the transistor Mi.

In the second two-quadrant multiplier, since the transistors have equal characteristics and the same input voltage $V_2'$ is applied to the gates of transistors M22 and M23, the drain currents of these transistors M22 and M23 are equal to each other, and the drain currents of transistors M32 and M33 are also equal to the drain currents of these transistors M22 and M23. As a result, transistors M32 and M33 have respective gate-to-source voltages $V_{GS32}$ and $V_{GS33}$ equal to the input voltage $V_2'$. Therefore, MOS transistors M32, M33, M12 and M13 have respective drain currents $I_{D32}$, $I_{D33}$, $I_{D12}$ and $I_{D13}$ expressed as follows:

$$I_{D32}=\beta(V_1-V_{TH})^2 \quad (2)$$

$$I_{D33}=\beta(V_1'-V_{TH})^2 \quad (3)$$

$$I_{D12}=\beta(V_2'-V_1-V_{TH})^2 \quad (4)$$

$$I_{D13}=\beta(V_2'-V_1'-V_{TH})^2 \quad (5)$$

Therefore, a differential output current ΔI' from the two-quadrant multiplier is represented by:

$$\begin{aligned}\Delta I' &= I_L - I_R \quad (6)\\ &= (I_{D33}+I_{D12})-(I_{D32}+I_{D13})\\ &= 2\beta V_X(2V_{TH}-V_2')\end{aligned}$$

where $V_x$ is the first differential input voltage expressed by $V_1=V_{R1}+V_x/2$, $V_1'=V_{R1}-V_x/2$ where $V_{R1}$ is a first reference voltage. The first reference voltage $V_{R1}$ is equal to the midpoint voltage of the first differential input voltage $V_x$. Since the threshold voltage $V_{TH}$ is constant, it can be seen from equation (6) that the two-quadrant multiplier operates linearly.

Since the first two-quadrant multiplier operates in the same manner as the second two-quadrant multiplier, the four-quadrant multiplier produces a differential output current ΔI expressed as follows:

$$
\begin{aligned}
\Delta I &= (I_{D12}+I_{D14}+I_{D31}+I_{D33}) - \\
&\quad (I_{D11}+I_{D13}+I_{D32}+I_{D34}) \\
&= ((I_{D33}+I_{D12}) - (I_{D32}+I_{D13})) - \\
&\quad ((I_{D34}+I_{D11}) - (I_{D31}+I_{D14})) \\
&= 2\beta V_x(2V_{TH} - (V_{R2} - V_y/2)) - \\
&\quad 2\beta V_x(2V_{TH} - (V_{R2} + V_y/2)) \\
&= 2\beta V_x V_y
\end{aligned} \tag{7}
$$

where $V_y$ is the second differential input voltage expressed by $V_2=V_{R2}+V_y/2$, $V_2'=V_{R2}-V_y/2$ where $V_{R2}$ is a second reference voltage. The second reference voltage $V_{R2}$ is equal to the midpoint voltage of the second differential input voltage $V_y$. It can be understood from equation (7) that the differential output current ΔI is proportional to the product of the differential input voltages $V_x$, $V_y$, and that the CMOS four-quadrant multiplier operates linearly.

K. Bult et al. disclose a four-quadrant multiplier with floating inputs, using the above CMOS four-quadrant multiplier. FIG. 2 of the accompanying drawings shows such a four-quadrant multiplier with floating inputs. The four-quadrant multiplier shown in FIG. 2 includes, in addition to the CMOS four-quadrant multiplier shown in FIG. 1, first and second constant-current sources 21, 22 for supplying respective currents $I_o$, $I_b$. The sources of MOS transistors M11 to M14 are connected in common to the first constant-current source 21 and the sources of the MOS transistors M31 to M34 are connected in common to the second constant-current source 22. The drains of transistors M21 to M24 are connected to the positive power supply $V_{DD}$. Transistors M11 to M14 constitute a quadritail cell sharing the first tail current $I_o$, and transistors M31 to M34 constitute a quadritail cell sharing the second tail current $I_b$.

In the four-quadrant multiplier shown in FIG. 2, the sum of and difference between the two differential input signals $V_x$, $V_y$ are applied to the MOS quadritail cell, i.e., the multiplier core, which draws a total current equal to the first tail current $I_o$. Therefore, respective drain currents $I_{D11}$ to $I_{D14}$ of transistors M11 to M14 are expressed as follows:

$$
\begin{aligned}
I_{D11} &= \beta(V_R - (V_x - V_y)/2 - V_S - V_{TH})^2 \\
&\quad (V_{GS11} >= V_{TH})
\end{aligned} \tag{8}
$$

-continued $$
\begin{aligned}
I_{D12} &= \beta(V_R - (V_x + V_y)/2 - V_S - V_{TH})^2 \\
&\quad (V_{GS12} >= V_{TH})
\end{aligned} \tag{9}
$$

$$
\begin{aligned}
I_{D13} &= \beta(V_R + (V_x - V_y)/2 - V_S - V_{TH})^2 \\
&\quad (V_{GS13} >= V_{TH})
\end{aligned} \tag{10}
$$

$$
\begin{aligned}
I_{D14} &= \beta(V_R + (V_x + V_y)/2 - V_S - V_{TH})^2 \\
&\quad (V_{GS14} >= V_{TH})
\end{aligned} \tag{11}
$$

where $V_R$ is a reference DC voltage of an input signal applied to the multiplier core, and $V_S$ a common source voltage of MOS transistors M11 to M14.

Since the tail current is represented by:

$$I_{D11}+I_{D12}+I_{D13}+I_{D14}=I_o \tag{12}$$

the differential output current ΔI from the MOS four-quadrant multiplier is indicated by the following equation:

$$
\begin{aligned}
\Delta I &= I^+ - I^- \\
&= (I_{D12}+I_{D14}) - (I_{D11}+I_{D13}) \\
&= \begin{cases}
2\beta V_x V_y & \left(|V_x| \leqq -\dfrac{V_y}{2} + \sqrt{\dfrac{I_o}{2\beta} - \dfrac{3}{4}V_y^2}\right) \\[2ex]
\dfrac{4}{3}\beta V_x V_y - \dfrac{1}{9}\,\mathrm{sgn}(V_x V_y)\left\{3I_o + \beta(|V_x|+|V_y|)^2 - \right. & \\
\quad \left. 4\beta(|V_x|+|V_y|)\sqrt{\dfrac{3I_o}{\beta} - 2(|V_x|+|V_y|)^2 + 6|V_x||V_y|}\right\} & \\
\quad \left(-\dfrac{|V_y|}{2} + \sqrt{\dfrac{I_o}{2\beta} - \dfrac{3}{4}V_y^2} \leqq |V_x| \leqq \dfrac{5|V_y|}{6} + \sqrt{\dfrac{I_o}{2\beta} - \dfrac{11}{36}V_y^2}\right) & \\[2ex]
\left(\beta V_y\sqrt{\dfrac{I_o}{\beta} - V_y^2}\right)\mathrm{sgn}(V_x) & \\
\quad \left(|V_x| \geqq \dfrac{5|V_y|}{6} + \sqrt{\dfrac{I_o}{2\beta} - \dfrac{11}{36}V_y^2}\right) &
\end{cases}
\end{aligned} \tag{13}
$$

As can be seen from equation (13), if input and output characteristics of a MOS transistor are expressed by the square-law relationships, then ideal multiplication characteristics are obtained in an input voltage range where any of the MOS transistors are not cut off. When an excessive input voltage is applied, however, since the MOS transistors are cut off, the MOS four-quadrant multiplier exhibits characteristics deviating from ideal multiplication characteristics.

Transfer characteristics of the multiplier which are calculated based on equation (13) are shown in FIG. 3 of the accompanying drawings. FIG. 3 illustrates the relation between the first differential input voltage $V_x$ and the differential output current ΔI with the second differential input voltage $V_y$ used as a parameter. It will be understood from FIG. 3 that the multiplier has limiting characteristics with respect to large signals. The multiplier has equal transconductance characteristics with respect to either of the differential input voltages $V_x$, $V_y$. When equation (13) is differentiated with respect to the first differential input voltage $V_x$ to determine transconductance characteristics, the transconductance characteristics are expressed as follow:

$$\frac{d(\Delta I)}{dV_x} = \begin{cases} 2\beta V_y & \left(|V_x| \leqq -\frac{|V_y|}{2} + \sqrt{\frac{I_o}{2\beta} - \frac{3}{4} V_y^2}\right) \\ \frac{4}{3}\beta V_y - \frac{4}{9}\beta \mathrm{sgn}(V_x V_y) \left\{ (|V_x| + |V_y|) - 2\beta\sqrt{\frac{3I_o}{\beta} - 2(|V_x|+|V_y|)^2 + 6V_xV_y} + \frac{4\beta(|V_x|+|V_y|)^2}{\sqrt{\frac{3I_o}{\beta} - 2(|V_x|+|V_y|)^2 + 6V_xV_y}} \right\} & \left(-\frac{|V_y|}{2} + \sqrt{\frac{I_o}{2\beta} - \frac{3}{4} V_y^2} \leqq |V_x| \leqq \frac{5|V_y|}{6} + \sqrt{\frac{I_o}{2\beta} - \frac{11}{36} V_y^2}\right) \\ 0 & \left(|V_x| \geqq \frac{5|V_y|}{6} + \sqrt{\frac{I_o}{2\beta} - \frac{11}{36} V_y^2}\right) \end{cases} \tag{14}$$

FIG. 4 of the accompanying drawings shows transconductance characteristics determined according to equation (14) using the second differential input voltage $V_y$ as a parameter.

As described above, a four-quadrant multiplier can be achieved by coupling two-quadrant multipliers. Since the two-quadrant multipliers can be regarded as variable-gain cells whose gain varies depending on an applied control voltage (tuning voltage), the four-quadrant multiplier can be formed by coupling differential outputs of the variable-gain cells.

FIG. 5 of the accompanying drawings shows a four-quadrant multiplier composed of variable-gain cells in combination. In FIG. 5, two variable-gain cells 51, 52 generate differential output currents depending on the differential input voltage $V_x$, and are composed of two-quadrant multipliers which operate linearly or two-quadrant multipliers which operate substantially linearly. A pair of input voltages as the differential input voltage $V_y$ is used as the tuning voltage applied to the variable-gain cells 51, 52.

The conventional MOS four-quadrant multiplier has a small degree of freedom for circuit design as almost no circuits other than the circuit disclosed by K. Bult et al. are known. The above four-quadrant multiplier has grounded sources, it is difficult to optionally apply an input signal thereto. The threshold voltage $V_{TH}$ of the transistors varies due to the fabrication process, the differential output current is affected by the variation of the threshold voltages. This problem may be solved by not grounding the sources of the transistors, but driving the transistors with constant-current sources to apply a floating input, as shown in FIG. 2. However, the arrangement shown in FIG. 2 still suffers the problem caused by the varying threshold voltage $V_{TH}$.

SUMMARY OF THE INVENTION

It is an object of the present invention to provide a MOS four-quadrant multiplier having a novel circuit arrangement.

Another object of the present invention is to provide a MOS four-quadrant multiplier which has a floating input, operates linearly, and allows an input signal to be applied easily.

According to the present invention, the first-mentioned object can be achieved by a MOS four-quadrant multiplier for outputting a combined differential output current corresponding to a product of first and second differential input voltages. The combined differential output current including a plurality of differential output currents. The MOS four-quadrant multiplier comprises first and second two-quadrant multipliers each having a differential output, each of the first and second two-quadrant multipliers having first and second pairs of transistors having sources connected in common to each other, and a third pair of transistors connected in cascode to the first pair of transistors as a load on the first pair of transistors, the second pair of transistors of one of the first and second two-quadrant multipliers having drains which are not connected in common to drains of the third pair of transistors of another of the first and second two-quadrant multipliers, the second pair of transistors having gates respectively connected to drains of the first pair of transistors and sources of the third pair of transistors in each of the first and second two-quadrant multipliers, the third pair of transistors of each of the first and second two-quadrant multipliers having gates connected in common to each other at a node in each of the first and second two-quadrant multipliers. Each differential output current of the plurality of differential output currents, which is generated in one of the first and second two-quadrant multipliers, comprises at least a drain current of the second pair of transistors included in the one of the first and second first and second two-quadrant multipliers. The differential outputs of the first and second two-quadrant multipliers being connected to each other to output the combined differential output current. The drains of all of the third pairs of transistors of the first and second two-quadrant multipliers are connected in common. The first differential input voltage is applied between the gates of the first pair of transistors in each of the first and second two-quadrant multipliers, and a second differential input voltage is applied between the node of the first two-quadrant multiplier and the node of the second two-quadrant multiplier.

The other object can be accomplished by a MOS four-quadrant multiplier for outputting a differential output current corresponding to a product of first and second differential input voltages. The MOS four-quadrant multiplier comprises a tail current source, and first, second, third, and fourth pairs of transistors having sources connected in common to each other and to the tail current source, and fifth and sixth pairs of transistors connected in cascode to the first and second pairs of transistors as loads respectively on the first and second pairs of transistors. The third and fourth pairs of transistors have gates respectively connected to drains of the first and second pairs of transistors. The first and second pairs of transistors have gates connected in common to each other for application to a first differential input voltage thereto. The fifth pair of transistors having gates connected in common to each other at a first node. The sixth pair of transistors have gates connected in common to each other at a second node. The first and second nodes have a second differential input voltage applied therebetween. The third pair of transistors have drains connected in common and the fourth pair of transistors have drains common. The differential output current contains at least drain currents of the third and fourth pairs of transistors.

The other object can also be accomplished by a MOS four-quadrant multiplier for outputting a combined differential output current corresponding to a product of first and second differential input voltages. The MOS four-quadrant multiplier includes first and second variable-gain cells for generating a differential output current at a gain depending on an applied tuning voltage in response to a first differential input voltage applied thereto. Each of the first and second variable-gain cells includes a tail current source, first and second pairs of transistors having sources connected in common to each other and to the tail current source, and a third pair of transistors connected in cascode to the first pair of transistors as a load on the first pair of transistors. The second pair of transistors having gates connected to drains of the first pair of transistors in each of the first and second variable-gain cells. The third pair of transistors has gates connected in common to each other at a node for applying the tuning voltage thereto in each of the first and second variable-gain cells. The first pair of transistors have gates for applying the first differential input voltage therebetween in each of the first and second variable-gain cells. The differential output current contains at least drain currents of the second pair of transistors. The first and second variable-gain cells have differential outputs coupled to each other for outputting a combined differential output current. The tuning voltage is applied between the node of the first variable-gain cell and the node of the second variable-gain cell.

The other object can further be accomplished by a MOS four-quadrant multiplier for outputting a combined differential output current corresponding to a product of first and second differential input voltages. The MOS four-quadrant multiplier includes a tail current source and first and second pairs of transistors having sources connected in common to each other and to the tail current source, the first and second pairs of transistors having drains connected in common to each other for generating a first differential output current, and an input circuit for generating gate input voltages to be applied to gates of the first and second pairs of transistors, the input circuit having third, fourth, fifth, and sixth pairs of transistors. The first differential output current forms part of the combined differential output current is outputted by adding the differential output current from the multiplier core and a differential output current from the input circuit.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

First Embodiment

Figure 6:
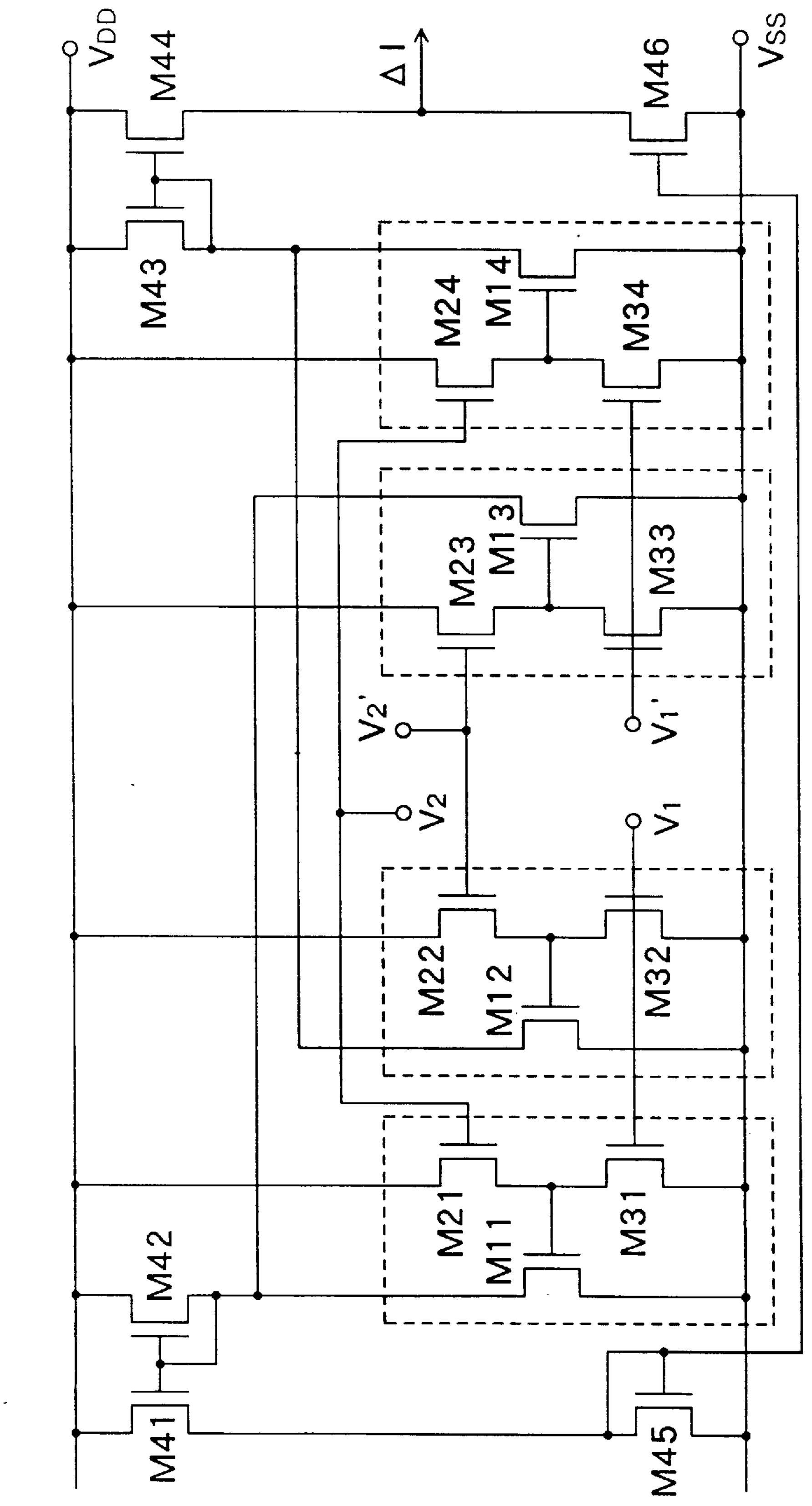
FIG. 6 is a circuit diagram of a MOS four-quadrant multiplier according to a first embodiment of the present invention.

FIG. 6 shows a MOS four-quadrant multiplier according to a first embodiment of the present invention. The MOS four-quadrant multiplier shown in FIG. 6 is of a circuit arrangement which differs from the conventional MOS four-quadrant multiplier shown in FIG. 1 in that the drains of MOS transistors M21 to M24 are connected to the positive power supply $V_{DD}$. Those parts shown in FIG. 6 which are identical to those shown in FIG. 1 are denoted by identical reference characters.

In the second two-quadrant multiplier in the MOS four-quadrant multiplier shown in FIG. 6, drain currents $I_{D32}$, $I_{D33}$, $I_{D12}$ and $I_{D13}$ of transistors M32, M33, M12 and M13 are expressed respectively by the above equations (2) to (5). The differential output current ΔI' of the second two-quadrant multiplier is given by:

$$\begin{aligned}\Delta I' &= I_L - I_R \\ &= I_{D12} - I_{D13} \\ &= 2\beta V_x(V_{TH} + V_{R1} - V_2')\end{aligned} \tag{15}$$

Figure 1:
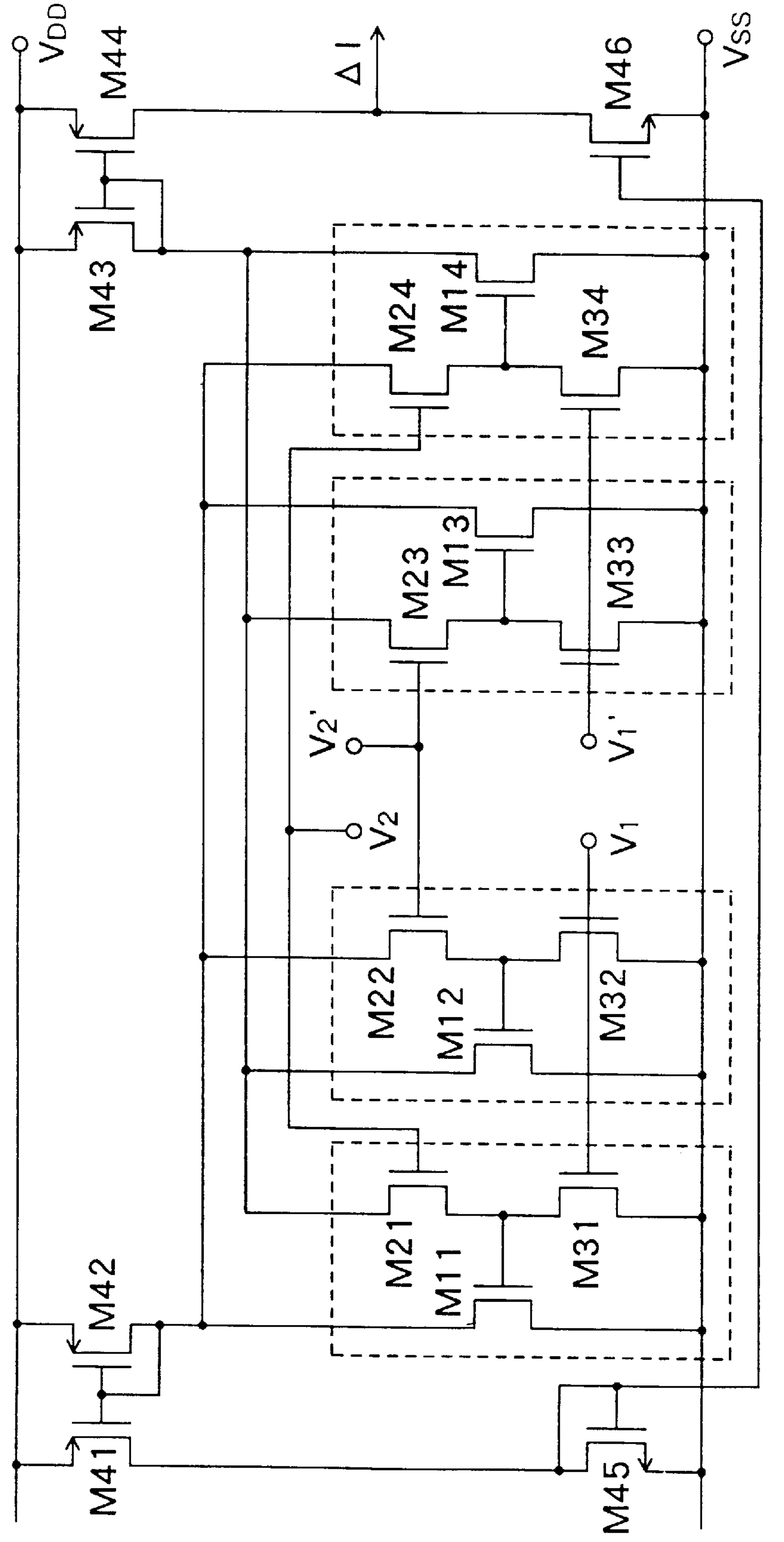
FIG. 1 (PRIOR ART)
FIG. 1 is a circuit diagram of a conventional MOS four-quadrant multiplier.
Figure 2:
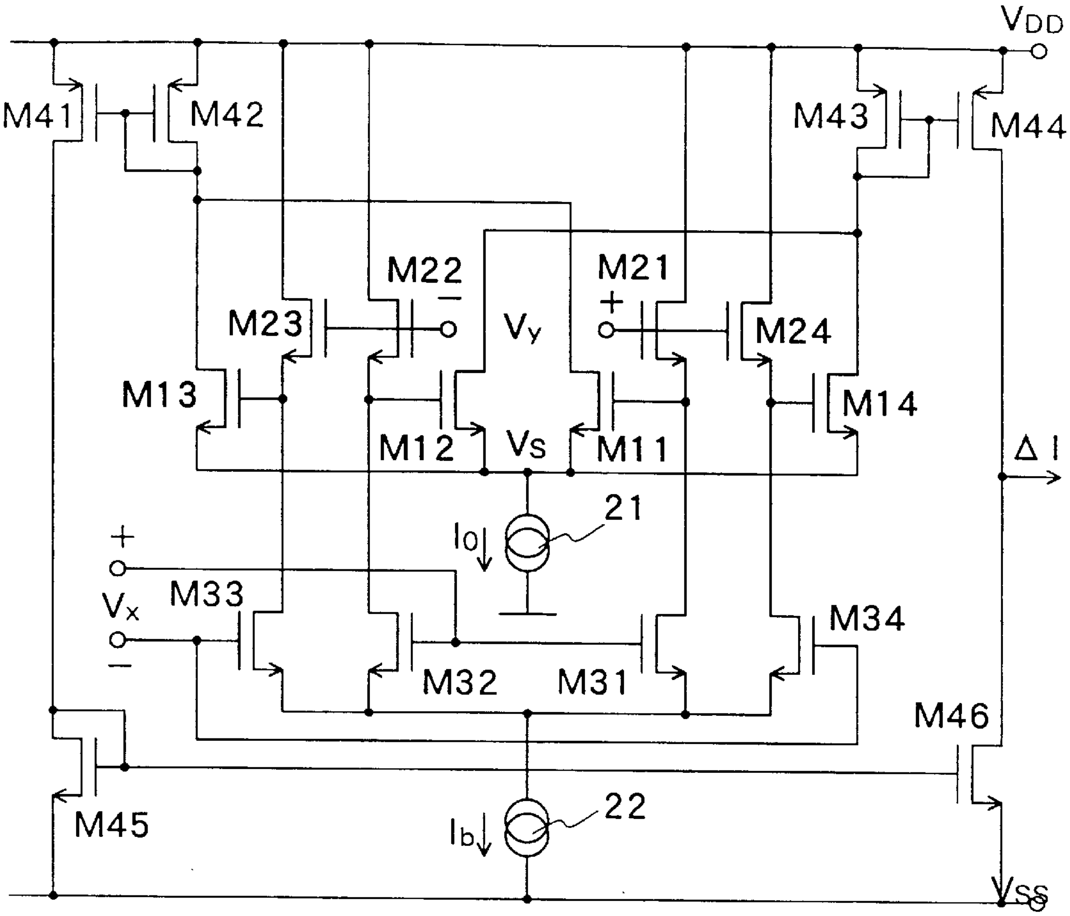
FIG. 2 (PRIOR ART)
FIG. 2 is a circuit diagram of a conventional MOS four-quadrant multiplier with a floating input.

Since the threshold voltage $V_{TH}$ is constant as with the circuit arrangement shown in FIG. 1, the second two-quadrant multiplier operates linearly. Similarly, the first two-quadrant multiplier also operates linearly.

Therefore, the differential output current ΔI of the MOS four-quadrant multiplier shown in FIG. 6 is expressed as follows:

$$\begin{aligned}\Delta I &= (I_{D12} + I_{D14}) - (I_{D11} + I_{D13}) \\ &= (I_{D12} - I_{D13}) - (I_{D11} - I_{D14}) \\ &= 2\beta V_x(V_{TH} + V_{R1} - (V_{R2} - V_y/2)) - \\ &\qquad 2\beta V_x(V_{TH} + V_{R1} - (V_{R2} + V_y/2)) \\ &= 2\beta V_x V_y\end{aligned} \tag{16}$$

where $V_x$, $V_y$, $V_{R1}$ and $V_{R2}$ are defined as described above.

As can be seen from equation (16), the CMOS four-quadrant multiplier shown in FIG. 6 operates linearly.

Figure 7:
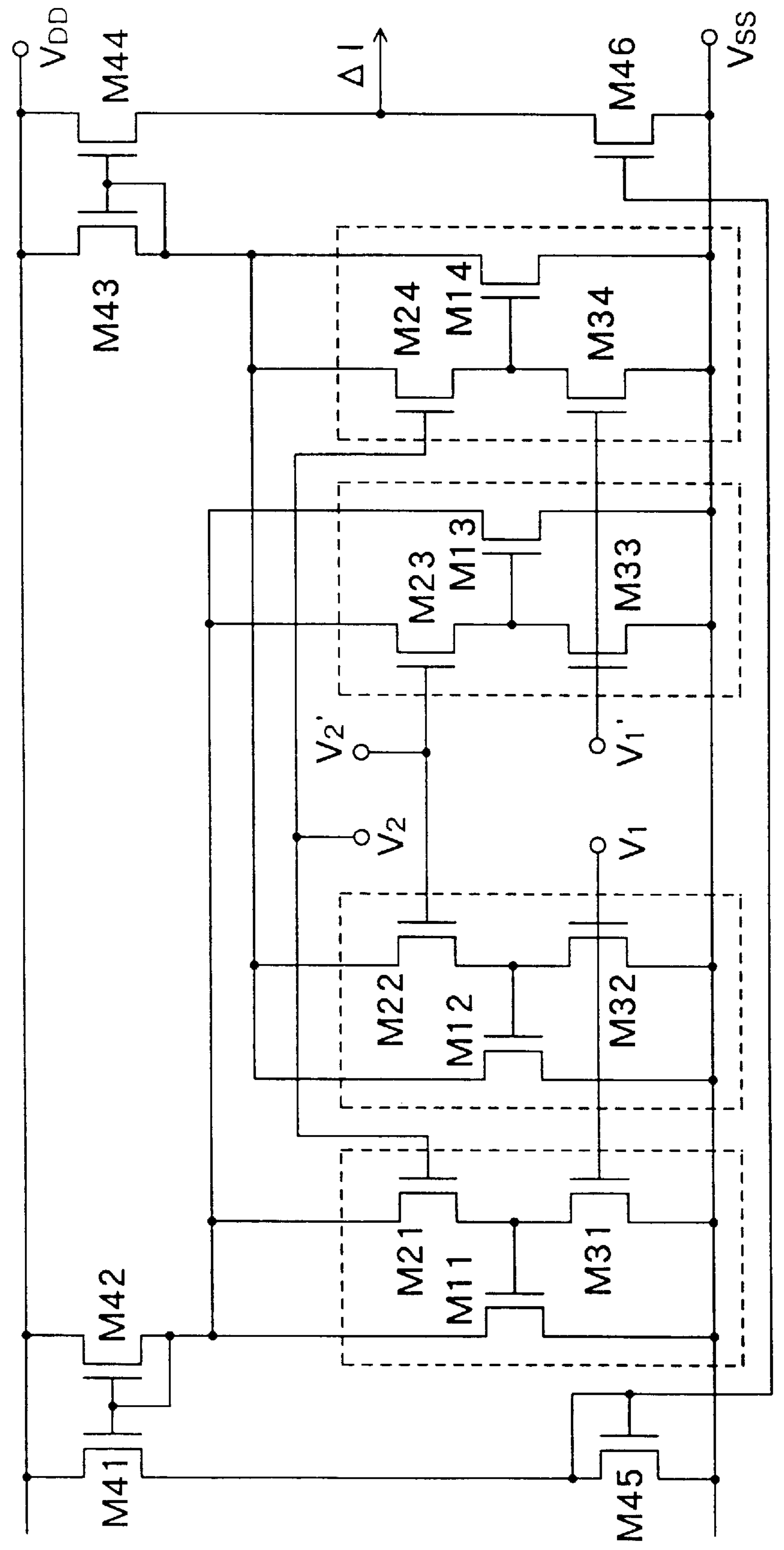
FIG. 7 is a circuit diagram of another MOS four-quadrant multiplier according to another aspect of the first embodiment of the present invention.

FIG. 7 shows another MOS four-quadrant multiplier according to the first embodiment of the present invention. The MOS four-quadrant multiplier shown in FIG. 7 is of a circuit arrangement which differs from the conventional MOS four-quadrant multiplier shown in FIG. 1 in that the drains of transistors M21 and M23 are connected to the drain of transistor M42 of the first current mirror, and the drains of transistors M22 and M24 are connected to the drain of transistor M43 of the second current mirror.

In the second two-quadrant multiplier in the MOS four-quadrant multiplier shown in FIG. 7, drain currents $I_{D32}$, $I_{D33}$, $I_{D12}$ and $I_{D13}$ of transistors M32, M33, M12 and M13 are expressed respectively by the above equations (2) to (5). The differential output current ΔI' of the second two-quadrant multiplier is given by:

$$\begin{aligned}\Delta I' &= I_L - I_R \quad (17)\\ &= (I_{D12}+I_{D32})-(I_{D13}+I_{D33})\\ &= 2\beta V_x(2V_{TH}+V_{R1}-V_2')\end{aligned}$$

Consequently, the second two-quadrant multiplier operates linearly, and similarly, the first two-quadrant multiplier also operates linearly.

Therefore, the differential output current ΔI of the MOS four-quadrant multiplier shown in FIG. 7 is expressed as follows:

$$\begin{aligned}\Delta I &= (I_{D12}+I_{D14}+I_{D32}+I_{D34}) - \quad (18)\\ &\quad (I_{D11}+I_{D13}+I_{D31}+I_{D33})\\ &= ((I_{D12}+I_{D32})-(I_{D13}+I_{D33})) -\\ &\quad ((I_{D11}-I_{D31})-(I_{D14}+I_{D34})\\ &= 2\beta V_x(2V_{TH}+V_{R1}-(V_{R2}-V_y/2)) -\\ &\quad 2\beta V_x(2V_{TH}+V_{R1}-(V_{R2}+V_y/2))\\ &= 2\beta V_x V_y\end{aligned}$$

As can be seen from equation (18), the CMOS four-quadrant multiplier shown in FIG. 7 operates linearly.

Second Embodiment

Figure 8:
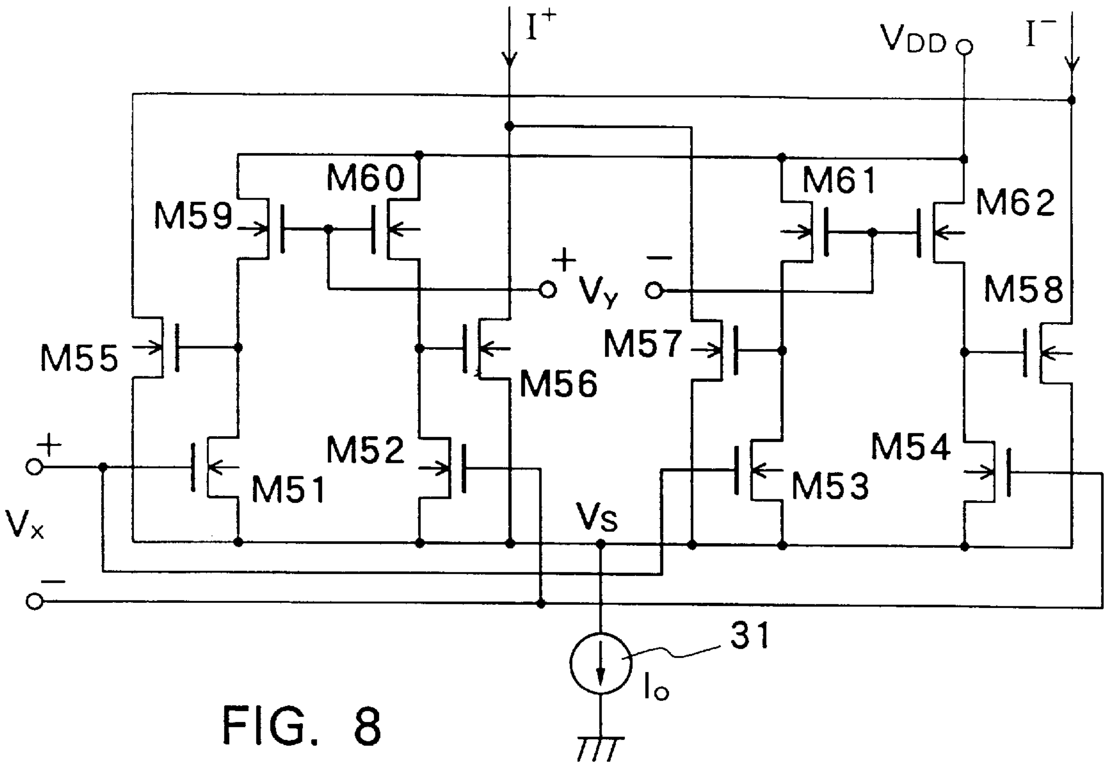
FIG. 8 is a circuit diagram of a MOS four-quadrant multiplier according to a second embodiment of the present invention.

Example 1:

FIG. 8 shows a MOS four-quadrant multiplier according to Example 1 of a second embodiment of the present invention. The MOS four-quadrant multiplier shown in FIG. 8 is composed of 12 MOS transistors M51 to M62 of equal characteristics and a tail current source 31 for supplying a constant current $I_o$. MOS transistors M51 to M58 have sources connected in common to the tail current source 31, constituting an octotail cell. MOS transistors M59 to M62 are connected in cascode to the drains of the transistors M51 to M54, respectively. Transistors M59 to M62 have drains connected in common to a power supply $V_{DD}$. The gates of transistors M55 to M58 are connected respectively to the drains of transistors M51 to M54. The MOS four-quadrant multiplier is supplied with a first differential input voltage $V_x$ and a second differential input voltage $V_y$. One of a pair of input terminals to which the first differential input voltage $V_x$ is applied is connected to the gates of transistors M51 and M53, and the other input terminal is connected to the gates of transistors M52 and M54. Likewise, one of a pair of input terminals to which the second differential input voltage $V_y$ is applied is connected to the gates of transistors M59 and M60, and the other input terminal is connected to the gates of transistors M61 and M62. The drains of transistors M56 and M57 are connected to each other. The sum of drain currents $I_{D56}$ and $I_{D57}$ of transistors M56 and M57 is represented by $I^+$. Similarly, the drains of transistors M55 and M58 are connected to each other. The sum of drain currents $I_{D55}$ and $I_{D58}$ of transistors M55 and M58 is represented by $I^-$.

Drain currents $I_{D51}$ to $I_{D58}$ of MOS transistors M51 to M58 are expressed as follows:

$$I_{D51}=I_{D53}=\beta(V_x/2+V_{R1}-V_S-V_{TH})^2 \quad (19)$$

$$I_{D52}=I_{D54}=\beta(-V_x/2+V_{R1}-V_S-V_{TH})^2 \quad (20)$$

$$I_{D55}=\beta(-V_x/2+V_y/2-V_{R1}+V_{R2}-V_{TH})^2 \quad (21)$$

$$I_{D56}=\beta(V_x/2+V_y/2-V_{R1}+V_{R2}-V_{TH})^2 \quad (22)$$

$$I_{D57}=\beta(-V_x/2-V_y/2-V_{R1}+V_{R2}-V_{TH})^2 \quad (23)$$

$$I_{D58}=\beta(V_x/2-V_y/2-V_{R1}+V_{R2}-V_{TH})^2 \quad (24)$$

where $V_{R1}$, $V_{R2}$ are reference DC voltages with respect to the first and second differential input voltages $V_x$, $V_y$. From the conditions of tail currents, the following relation is satisfied:

$$I_{D51}+I_{D52}+I_{D53}+I_{D54}+I_{D55}+I_{D56}+I_{D57}+I_{D58}=I_o \quad (25)$$

By solving equations (19) to (25), the differential output current ΔI of the MOS four-quadrant multiplier shown in FIG. 8 is given by:

$$\begin{aligned}\Delta I &= I^+ - I^- \quad (26)\\ &= (I_{D56}+I_{D57})-(I_{D55}+I_{D58})\\ &= 2\beta V_x V_y\end{aligned}$$

Therefore, the MOS four-quadrant multiplier operates linearly in an input voltage range in which any of the transistors of the octotail cell are not cut off.

Figure 9:
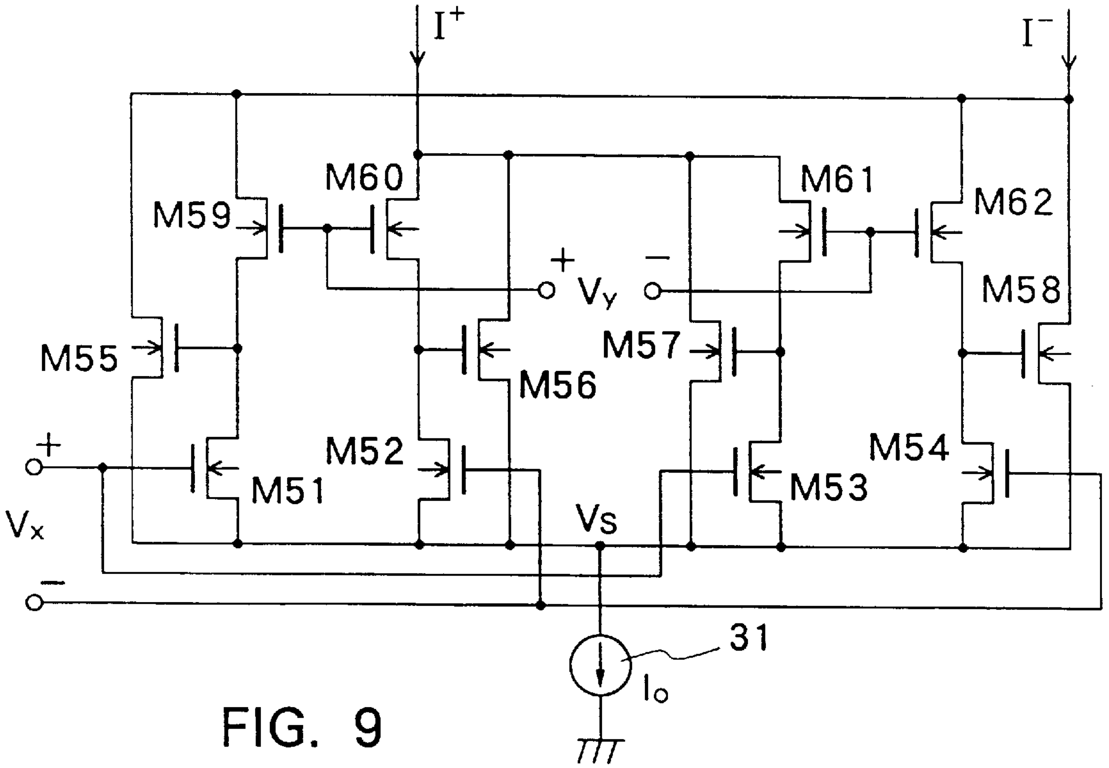
FIGS. 9 and 10 are circuit diagrams of other MOS four-quadrant multipliers according to the second embodiment of the present invention.

Example 2:

FIG. 9 shows a MOS four-quadrant multiplier according to Example 2 of the second embodiment of the present invention. The MOS four-quadrant multiplier shown in FIG. 9 differs from the MOS four-quadrant multiplier shown in FIG. 8 in that the drains of MOS transistors M56, M57, M60 and M61 are connected in common to each other, and the drains of MOS transistors M55, M58, M59 and M62 are connected in common to each other. The sum of drain currents $I_{D56}$, $I_{D57}$, $I_{D60}$ and $I_{D61}$ of transistors M56, M57, M60 and M61 is represented by $I^+$, and the sum of drain currents $I_{D55}$, $I_{D58}$, $I_{D59}$ and $I_{D62}$ of transistors M55, M58, M59 and M62 is represented by $I^-$.

In the MOS four-quadrant multiplier, drain currents $I_{D51}$ to $I_{D58}$ of transistors M51 to M58 are expressed by the above equations (19) to (24). Since the condition of the tail currents represented in equation (25) is satisfied, the differential output current ΔI of the MOS four-quadrant multiplier shown in FIG. 9 is given by:

$$\begin{aligned}\Delta I &= I^+ - I^- \quad (27)\\ &= (I_{D52}+I_{D53}+I_{D56}+I_{D57}) -\\ &\quad (I_{D51}+I_{D54}+I_{D55}+I_{D58})\\ &= (I_{D56}+I_{D57})-(I_{D55}+I_{D58})\\ &= 2\beta V_x V_y\end{aligned}$$

Therefore, the MOS four-quadrant multiplier operates linearly in an input voltage range in which any of the transistors of the octotail cell are not cut off.

Figure 10:
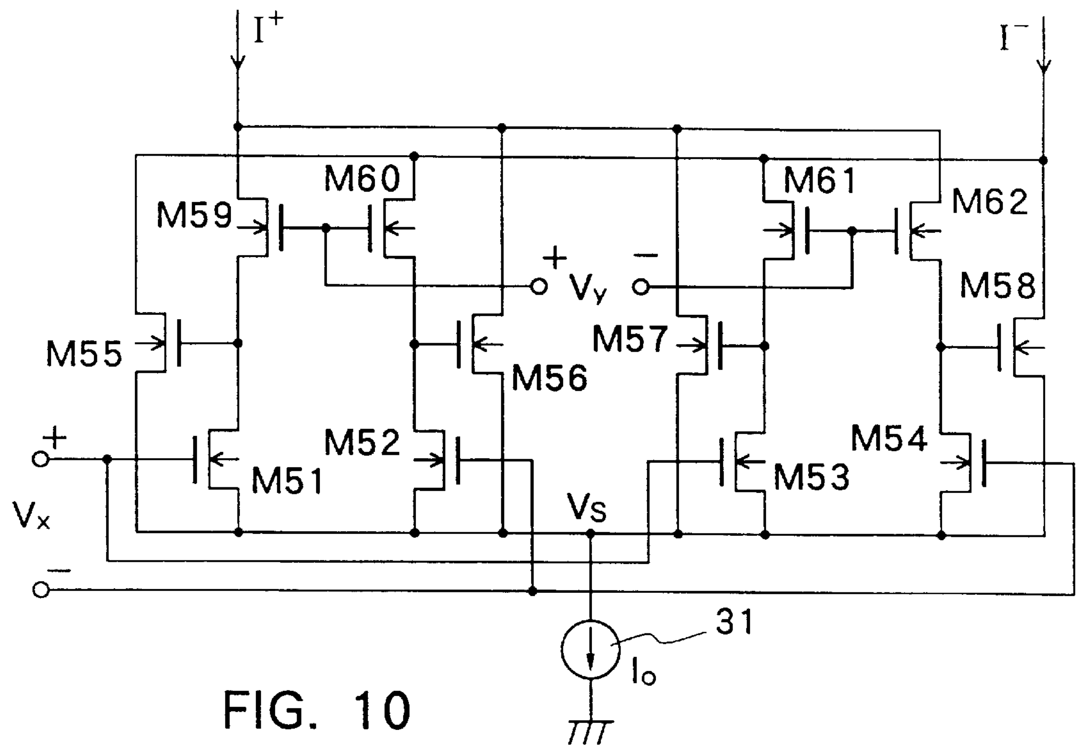

Example 3:

FIG. 10 shows a MOS four-quadrant multiplier according to Example 3 of the second embodiment of the present invention. The MOS four-quadrant multiplier shown in FIG. 10 differs from the MOS four-quadrant multiplier shown in FIG. 8 in that the drains of transistors M56, M57, M59 and M62 are connected in common to each other, and the drains of transistors M55, M58, M60 and M61 are connected in common to each other. The sum of drain currents $I_{D56}$, $I_{D57}$, $I_{D59}$ and $I_{D62}$ of transistors M56, M57, M59 and M62 is represented by $I^+$, and the sum of drain currents $I_{D55}$, $I_{D58}$, $I_{D60}$ and $I_{D61}$ of transistors M55, M58, M60 and M61 is represented by $I^-$.

In the MOS four-quadrant multiplier, drain currents $I_{D51}$ to $I_{D58}$ of transistors M51 to M58 are expressed by the above equations (19) to (24). Since the condition of the tail currents represented in equation (25) is satisfied, the differential output current ΔI of the MOS four-quadrant multiplier shown in FIG. 10 is given by:

$$\begin{aligned}\Delta I &= I^+ - I^- \quad (28)\\ &= (I_{D51} + I_{D54} + I_{D56} + I_{D57}) - \\ &\quad (I_{D52} + I_{D53} + I_{D55} + I_{D58})\\ &= (I_{D56} + I_{D57}) - (I_{D55} + I_{D58})\\ &= 2\beta V_x V_y\end{aligned}$$

Therefore, the MOS four-quadrant multiplier operates linearly in an input voltage range in which any of the transistors of the octotail cell are not cut off.

The MOS four-quadrant multipliers according to the second embodiment of the present invention shown in FIGS. 8 to 10 respond linearly to input voltages, and have floating inputs. Since each of the MOS four-quadrant multipliers employs an octotail cell including MOS transistors having their sources connected in common a tail current source 31, the variations of threshold voltages do not affect the differential output current. Therefore, the circuit current does not fluctuate and the reference voltages $V_{R1}$, $V_{R2}$ are stable, so that a differential input voltage can be applied easily.

In the MOS four-quadrant multipliers according to the second embodiment of the present invention, transistors M55 to M58 of all the transistors making up the octotail cell are directly involved in the multiplying function. The input voltage range in which the multiplier operates linearly is determined by the sum of currents flowing through transistors M55 to M58. When the sum of these currents is increased four times, the input voltage range in which the multiplier operates linearly is doubled. Since the eight MOS transistors M51 to M58 share the constant-current source 31 in the second embodiment, however, it is not possible to uniquely determine currents flowing through transistors M55 to M58 which are directly involved in the multiplying function. If the sum of currents flowing through transistors M55 to M58 is increased four times, then the currents flowing through transistors M51 to M54 are also increased four times.

Third Embodiment

As described above, a four-quadrant multiplier can be achieved by coupling two variable-gain cells. In the third embodiment, each of the variable-gain cells comprises a cascoded quadritail cell having the same input and output characteristics as a two-quadrant multiplier. The cascoded quadritail cell comprises a quadritail cell composed of two pairs of transistors having sources connected in common to each other and to a single tail current source, and a pair of transistors connected in cascode to the quadritail cell. Since the cascoded quadritail cell is driven by the single tail current source, the variations of threshold voltages do not affect the differential output current. Therefore, according to the third embodiment, a differential input voltage can be applied easily.

Figure 11:
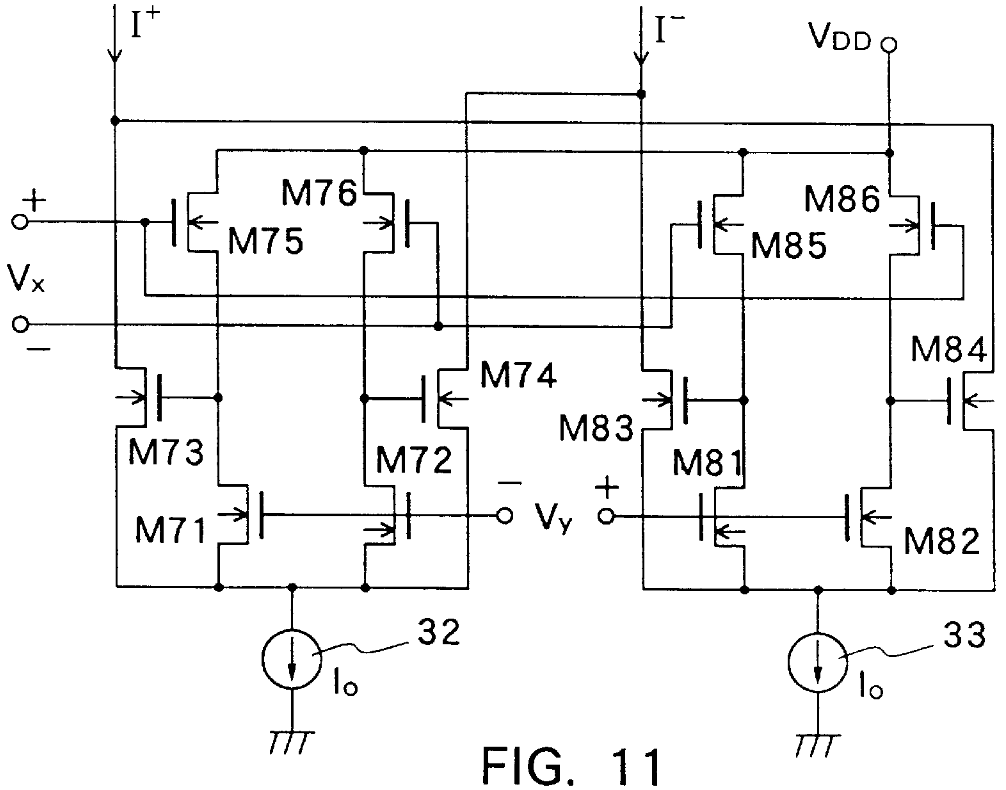
FIG. 11 is a circuit diagram of a MOS four-quadrant multiplier according to a third embodiment of the present invention.

Example 1:

FIG. 11 shows a MOS four-quadrant multiplier according to Example 1 of the third embodiment of the present invention. The MOS four-quadrant multiplier shown in FIG. 11 is composed of 12 MOS transistors M71 to M76 and M81 to M86 of equal characteristics and first and second tail current sources 32, 33 each for supplying an identical constant current $I_o$. Transistors M71 to M76 and the first tail current source 32 jointly serve as a first cascoded quadritail cell, and transistors M81 to M86 and the second tail current source 33 jointly serve as a second cascoded quadritail cell.

In the first cascoded quadritail cell, transistors M71 to M74 have sources connected in common to the first tail current source 32. Transistors M75 and M76 are connected as loads to the drains of transistors M71 and M72, respectively. The gates of transistors M73 and M74 are connected respectively to the drains of transistors M71 and M72. Similarly, in the second cascoded quadritail cell, transistors M81 to M84 have sources connected in common to the second tail current source 33. Transistors M85 and M86 are connected in cascode to transistors M81 and M82, respectively. The gates of transistors M83 and M84 are connected respectively to the drains of transistors M81 and M82.

The power supply voltage $V_{DD}$ is supplied to the drains of transistors M75, M76, M85 and M86. The drains of transistors M73 and M84 are connected to each other, and the sum of drain currents $I_{D73}$ and $I_{D84}$ of transistors M73 and M84 is represented by $I^+$. The drains of transistors M74 and M83 are connected to each other, and the sum of drain currents $I_{D74}$ and $I_{D83}$ of transistors M74 and M83 is represented by $I^-$.

The MOS four-quadrant multiplier is supplied with an input signal composed of first and second differential input voltages $V_x$, $V_y$. One of a pair of input terminals to which the first differential input voltage $V_x$ is applied is connected to the gates of transistors M75 and M86, and the other input terminal is connected to the gates of transistors M76 and M85. Likewise, one of a pair of input terminals to which the second differential input voltage $V_y$ is applied is connected to the gates of transistors M81 and M82, and the other input terminal is connected to the gates of transistors M71 and M72. Through the above connections, the cascoded quadritail cells are coupled to each other.

In the first cascoded quadritail cell, if a transistor Mi has a gate-to-drain voltage $V_{GSi}$ and a drain current $I_{Di}$, then the relations $I_{D71}=I_{D72}$, $V_{GS71}=V_{GS72}=V_{GS75}=V_{GS76}=V_y^-{-}V_S$ are satisfied. Therefore, drain currents $I_{D71}$ to $I_{D74}$ of transistors M71 to M74 are expressed by the following equations:

$$I_{D71}=I_{D72}=\beta(V_y^- - V_S - V_{TH})^2 \quad (29)$$

$$I_{D73}=\beta(V_x/2+V_{R1}-V_y^- - V_{TH})^2 \quad (30)$$

$$I_{D74}=\beta(-V_x/2+V_{R1}-V_y^- - V_{TH})^2 \quad (31)$$

where $V_S$ is the common source voltage of transistors M71 to M74, $V_y^-$ the gate voltage of transistors M71 and M72, which is expressed by $V_y^-=V_{R2}-V_y/2$, and $V_{R1}$ and $V_{R2}$ reference DC voltages with respect to the first and second differential input voltages $V_x$ and $V_y$. From the conditions of tail currents, the following relation is satisfied:

$$I_{D71}+I_{D72}+I_{D73}+I_{D74}=I_o \quad (32)$$

Therefore, the differential output current ΔI' of the first cascoded quadritail cell is given by:

$$\begin{aligned}\Delta I' &= I_L - I_R \quad (33)\\ &= I_{D73} - I_{D74}\\ &= 2\beta V_x(V_{R1} - V_y^- - V_{TH})\end{aligned}$$

The common source voltage $V_S$ depends on the first differential input voltage $V_x$ and is represented by:

$$V_S = V_y^- - V_{TH} - \sqrt{\frac{I_o}{2\beta} - \frac{1}{4}V_x^2 - (V_{R1} - V_y^- - V_{TH})^2} \quad (34)$$

As indicated by equation (33), the differential output current ΔI' does not contain any term relative to the common source voltage $V_S$, and hence the first cascoded quadritail cell operates linearly. If the first cascoded quadritail cell is regarded as a variable-gain cell, then the variable-gain cell amplifies the first differential input voltage $V_x$ and outputs the differential output current ΔI', the amplification factor being determined depending on the voltage $V_y^-$. Stated otherwise, the voltage $V_y^-$ is used as a tuning voltage for establishing the amplification factor. It can be understood from a similar analysis that the second cascoded quadritail cell also operates linearly.

Consequently, the differential output current ΔI of the MOS four-quadrant multiplier shown in FIG. 11 is given by:

$$\begin{aligned} \Delta I &= I^+ - I^- \\ &= (I_{D73} + I_{D84}) - (I_{D74} + I_{D83}) \\ &= 2\beta V_x(V_R + V_y/2 - V_{TH}) - 2\beta V_x(V_R - V_y/2 - V_{TH}) \\ &= 2\beta V_x V_y \end{aligned} \tag{35}$$

where $V_R = V_{R1} - V_{R2}$. It can be seen from equation (35) that the MOS four-quadrant multiplier shown in FIG. 11 operates linearly.

Examples 2 and 3:

An arrangement for obtaining a differential output current ΔI' from a cascoded quadritail cell is not limited to the arrangement shown in FIG. 11. In a MOS four-quadrant multiplier according to Example 2 shown in FIG. 12, two pairs of transistors of the quadritail cell are connected in parallel to each other. Specifically, transistors M73, M75, M84 and M86 have drains connected in common to each other, and the sum of drain currents of transistors M73, M75, M84 and M86 is represented by $I^+$, and transistors M74, M76, M83 and M85 have drains connected in common to each other, and the sum of drain currents of transistors M74, M76, M83 and M85 is represented by $I^-$. Inasmuch as drain currents $I_{D71}$ to $I_{D74}$ of transistors M71 to M74 are expressed by equations (29) to (32), the differential output current ΔI' of the first cascoded quadritail cell is expressed by:

$$\begin{aligned} \Delta I' &= I_L - I_R \\ &= (I_{D71} + I_{D73}) - (I_{D72} + I_{D74}) \\ &= 2\beta V_x(V_{R1} - V_y^- - V_{TH}) \end{aligned} \tag{36}$$

The common source voltage $V_S$ is represented by equation (34), and depends on the first differential input voltage $V_x$. Because the differential output current ΔI' does not contain any term relative to the common source voltage $V_S$, the cascoded quadritail cell operates linearly.

Figure 12:
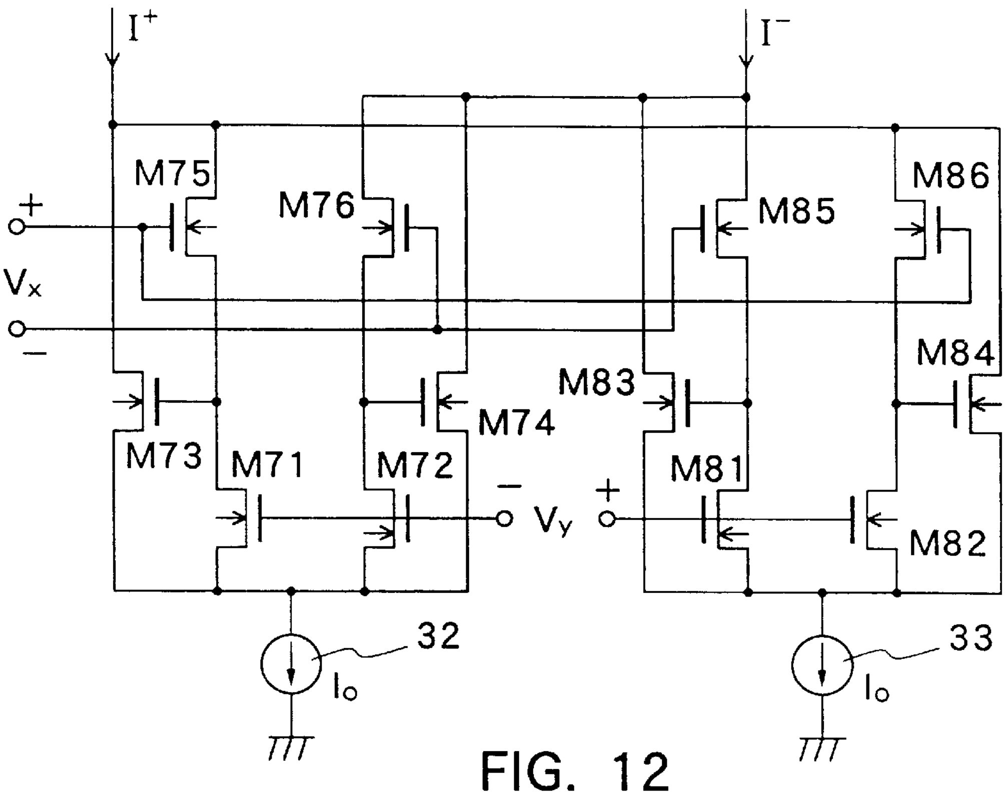
FIGS. 12, 13, 14, 15, and 16 are circuit diagrams of other MOS four-quadrant multipliers according to the third embodiment of the present invention.

As with the circuit arrangement show in FIG. 11, the differential output current ΔI of the MOS four-quadrant multiplier shown in FIG. 12 is given by:

$$\begin{aligned} \Delta I &= I^+ - I^- \\ &= (I_{D71} + I_{D73} + I_{D82} + I_{D84}) - \\ &\qquad (I_{D72} + I_{D74} + I_{D81} + I_{D83}) \\ &= 2\beta V_x(V_R - V_y/2 - V_{TH}) - 2\beta V_x(V_R - V_y/2 - V_{TH}) \\ &= 2\beta V_x V_y \end{aligned} \tag{37}$$

It can be seen from equation (37) that the MOS four-quadrant multiplier shown in FIG. 12 has the same input and output characteristics as the MOS four-quadrant multiplier shown in FIG. 11, and operates linearly.

Figure 13:
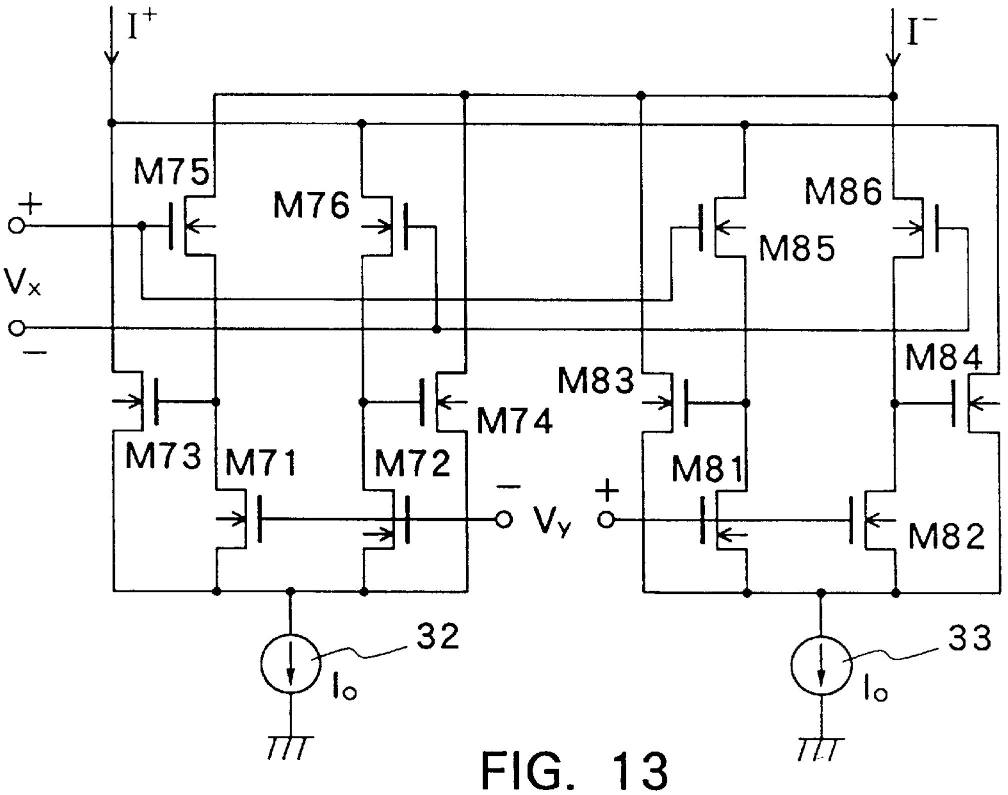

In a MOS four-quadrant multiplier according to Example 3 shown in FIG. 13, two pairs of transistors of the quadritail cell are coupled to each other. Specifically, transistors M73, M76, M84 and M85 have drains connected in common to each other, and the sum of drain currents of transistors M73, M76, M84 and M85 is represented by $I^+$, and transistors M74, M75, M83 and M86 have drains connected in common to each other, and the sum of drain currents of transistors M74, M75, M83 and M86 is represented by $I^-$. Inasmuch as drain currents $I_{D71}$ to $I_{D74}$ of transistors M71 to M74 are expressed by above equations (29) to (32), the differential output current ΔI' of the first cascoded quadritail cell is expressed by:

$$\begin{aligned} \Delta I' &= I_L - I_R \\ &= (I_{D72} + I_{D73}) - (I_{D71} + I_{D74}) \\ &= 2\beta V_x(V_{R1} - V_y^- - V_{TH}) \end{aligned} \tag{38}$$

Each of the cascoded quadritail cells operates linearly. The differential output current ΔI of the MOS four-quadrant multiplier shown in FIG. 13 is given by:

$$\begin{aligned} \Delta I &= I^+ - I^- \\ &= (I_{D72} + I_{D73} + I_{D81} + I_{D84}) - \\ &\qquad (I_{D71} + I_{D74} + I_{D82} + I_{D83}) \\ &= 2\beta V_x(V_R + V_y/2 - V_{TH}) - 2\beta V_x(V_R - V_y/2 - V_{TH}) \\ &= 2\beta V_x V_y \end{aligned} \tag{39}$$

It can be seen from equation (38) that the MOS four-quadrant multiplier shown in FIG. 13 have the same input and output characteristics as the MOS four-quadrant multiplier shown in FIG. 11, and operates linearly.

Figure 14:
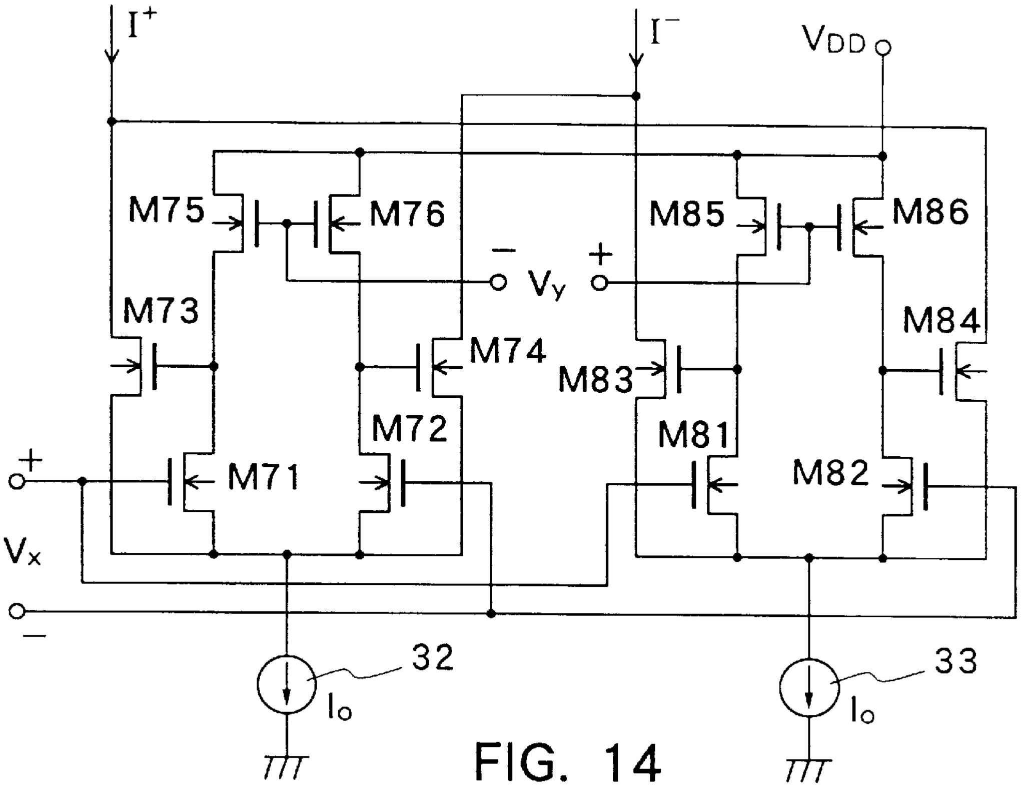

Example 4:

In the MOS four-quadrant multipliers shown in FIGS. 11 to 13, the differential input voltage is applied to one of the pairs of transistors connected in cascoded which is remote from the tail current source in each of the cascoded quadritail cells. However, it is possible to apply the differential input voltage to one of the pairs of transistors which is closer to the tail current source. A MOS four-quadrant multiplier according to Example 4 shown in FIG. 14 employs cascoded quadritail cells of such an arrangement. The MOS four-quadrant multiplier shown in FIG. 14 is of substantially the same arrangement as the MOS four-quadrant multiplier shown in FIG. 11 except that the first and second differential input voltages $V_x$, $V_y$ are applied in a different way. Specifically, one of a pair of input terminals to which the first differential input voltage $V_x$ is applied is connected to the gates of transistors M71 and M81, and the other input terminal is connected to the gates of transistors M72 and M82. Likewise, one of a pair of input terminals to which the second differential input voltage $V_y$ is applied is connected to the gates of transistors M85 and M86, and the other input terminal is connected to the gates of transistors M75 and M76.

Because $V_{GS71} = V_{GS75}$, $V_{GS72} = V_{GS76}$, $I_{D71} = I_{D75}$, $I_{D72} = I_{D76}$, drain currents $I_{D71}$ to $I_{D74}$ of transistors M71 to M74 of the first cascoded quadritail cell are expressed by the following equations:

$$I_{D71} = \beta(V_x/2 + V_{R1} - V_S - V_{TH})^2 \tag{40}$$

$$I_{D72} = \beta(-V_x/2 + V_{R1} - V_S - V_{TH})^2 \tag{41}$$

$$I_{D73} = \beta(V_y^- - V_x/2 - V_{R1} - V_{TH})^2 \tag{42}$$

$$I_{D74} = \beta(V_y^- + V_x/2 - V_{R1} - V_{TH})^2 \tag{43}$$

Since the condition of the tail currents represented equation (32) is satisfied, the differential output current ΔI' of the cascoded quadritail cell is given by:

$$\begin{aligned} \Delta I' &= I_L - I_R \\ &= I_{D73} - I_{D74} \\ &= 2\beta V_x(V_{R1} - V_y^- - V_{TH}) \end{aligned} \tag{44}$$

The common source voltage $V_S$ depends on the differential input voltage $V_x$, and is represented by:

$$V_S = V_{R1} - V_{TH} - \sqrt{\frac{I_o}{2\beta} - \frac{1}{2} V_x^2 - (V_y^- - V_{R1} - V_{TH})^2} \quad (45)$$

The common source voltage $V_S$ is not of a constant value. Since any term relative to the common source voltage $V_S$ is eliminated from equation (44), the first cascoded quadritail cell operates linearly. Similarly, the second cascoded quadritail cell operates linearly.

Therefore, the differential output current ΔI of the MOS four-quadrant multiplier shown in FIG. 14 is given by:

$$\begin{aligned} \Delta I &= (I_{D73} + I_{D84}) - (I_{D74} + I_{D83}) \quad (46) \\ &= 2\beta V_x(V_R + V_y/2 + V_{TH}) - 2\beta V_x(V_R - V_y/2 + V_{TH}) \\ &= 2\beta V_x V_y \end{aligned}$$

The MOS four-quadrant multiplier shown in FIG. 14 operates linearly.

Figure 15:
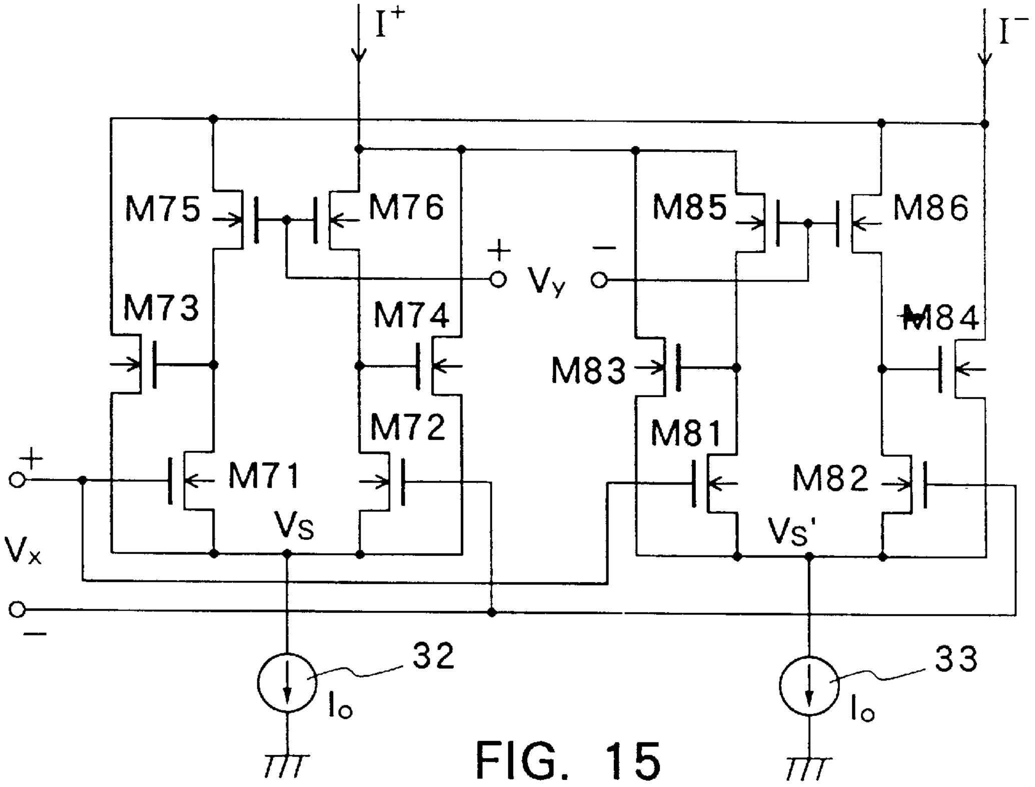

Example 5:

A MOS four-quadrant multiplier according to Example 5 shown in FIG. 15 employs balanced cascoded quadritail cells. The MOS four-quadrant multiplier shown in FIG. 15 is of substantially the same arrangement as the MOS four-quadrant multiplier shown in FIG. 12 except that the first and second differential input voltages $V_x$, $V_y$ are applied in a different way and the currents $I^+$, $I^-$ are extracted in a reversed manner. Specifically, one of a pair of input terminals to which the first differential input voltage $V_x$ is applied is connected to the gates of transistors M71 and M81, and the other input terminal is connected to the gates of transistors M72 and M82. Likewise, one of a pair of input terminals to which the second differential input voltage $V_y$ is applied is connected to the gates of transistors M75 and M76, and the other input terminal is connected to the gates of transistors M85 and M86.

Because equations (40) to (43) are satisfied for drain currents $I_{D71}$ to $I_{D74}$ of transistors M71 to M74 of the first cascoded quadritail cell and also equations (32) and (45) are satisfied, the differential output current ΔI' of the first cascoded quadritail cell is given by:

$$\begin{aligned} \Delta I' &= I_L - I_R \quad (47) \\ &= (I_{D71} + I_{D73}) - (I_{D72} + I_{D74}) \\ &= 2\beta V_x(2V_{R1} - V_y^+ - V_S) \end{aligned}$$

where $V_y^+$ is the gate voltage of transistors M75 and M76 and represented by $V_y^+=V_{R2}+V_y/2$. As indicated by equation (45), the common source voltage $V_S$ depends on the differential input voltage $V_x$ and is not constant. The common source voltage $V_S$ remains as a nonlinear term in the equation of the differential output current ΔI' of the first cascoded quadritail cell. Therefore, the linearity of the first cascoded quadritail cell is poorer than that of the MOS four-quadrant multipliers shown in FIGS. 11 to 14.

The differential output current ΔI of the MOS four-quadrant multiplier shown in FIG. 15 is given by:

$$\begin{aligned} \Delta I &= (I_{D72} + I_{D74} + I_{D81} + I_{D83}) - \quad (48) \\ &\quad (I_{D71} + I_{D73} + I_{D82} + I_{D84}) \\ &= -((I_{D71} + I_{D73}) - (I_{D72} + I_{D74})) + \\ &\quad ((I_{D81} + I_{D83}) - (I_{D82} + I_{D84})) \\ &= -2\beta V_x(2V_{R1} - V_y/2 + V_{R2} - V_S) + \\ &\quad 2\beta V_x(2V_{R1} - (-V_y/2 + V_{R2}) - V_S') \\ &= 2\beta V_x V_y + 2\beta V_x(V_S - V_S') \end{aligned}$$

where $V_S$, $V_S'$ represent the common source voltages respectively in the first and second cascoded quadritail cells. The following equation (49) is satisfied with respect to the common source voltages $V_S$, $V_S'$:

$$V_S - V_S' = -\sqrt{\frac{I_o}{2\beta} - \frac{1}{2} V_x^2 - \left(\frac{1}{2} V_y - V_{R1} + V_{R2} - V_{TH}\right)^2} + \sqrt{\frac{I_o}{2\beta} - \frac{1}{2} V_i^2 - \left(-\frac{1}{2} V_y - V_{R1} + V_{R2} - V_{TH}\right)^2} \quad (49)$$

If the following relation (50) is satisfied, then equation (49) can be approximated by the following equation (51):

$$\frac{I_o}{2\beta} - \frac{1}{2} V_i^2 >> \left(\pm\frac{1}{2} V_y - V_{R1} + V_{R2} - V_{TH}\right)^2 \quad (50)$$

$$V_S - V_S' \approx \frac{V_y(V_{R1} - V_{R2} + V_{TH})}{\sqrt{\frac{I_o}{2\beta} - \frac{1}{2} V_x^2}} \quad (51)$$

From equations (50), (51), the common source voltages $V_S$, $V_S'$ can be regarded as $V_S-V_S'\approx 0$ if both the differential input voltages $V_x$, $V_y$ are small. Therefore, the input and output characteristics of the MOS four-quadrant multiplier composed of balanced cascoded quadritail cells coupled as variable-gain cells to each other are multiplication characteristics with practical linearity where nonlinear terms are considerably canceled by each other. Since the transconductance characteristics of the balanced cascoded quadritail cells are of a monotonously decreasing nature with respect to the input voltage, the transconductance characteristics of the MOS four-quadrant multiplier are also of a monotonously decreasing nature with respect to the input voltage.

Figure 16:
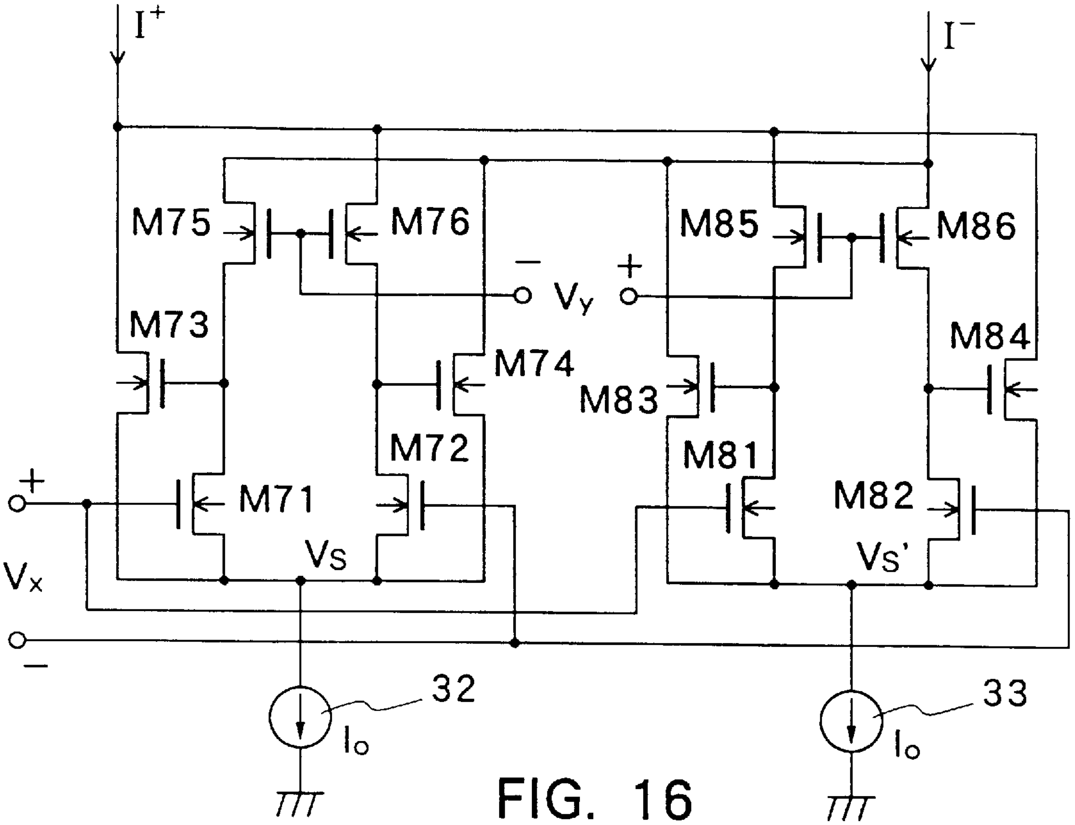

Example 6:

A MOS four-quadrant multiplier according to Example 6 shown in FIG. 16 employs unbalanced cascoded quadritail cells. The MOS four-quadrant multiplier shown in FIG. 16 is of substantially the same arrangement as the MOS four-quadrant multiplier shown in FIG. 13 except that the first and second differential input voltages $V_x$, $V_y$ are applied in a different way. Specifically, one of a pair of input terminals to which the first differential input voltage $V_x$ is applied is connected to the gates of transistors M71 and M81, and the other input terminal is connected to the gates of transistors M72 and M82. Likewise, one of a pair of input terminals to which the second differential input voltage $V_y$ is applied is connected to the gates of transistors M85 and M86, and the other input terminal is connected to the gates of transistors M75 and M76.

Because equations (40) to (43) are satisfied for drain currents $I_{D71}$ to $I_{D74}$ of transistors M71 to M74 of the first cascoded quadritail cell and also equations (32) and (45) are satisfied, the differential output current ΔI' of the first cascoded quadritail cell is given by:

$$\begin{aligned} \Delta I' &= I_L - I_R \quad (52) \\ &= (I_{D72} + I_{D73}) - (I_{D71} + I_{D74}) \\ &= 2\beta V_x(V_y^- - V_S - 2V_{TH}) \end{aligned}$$

As indicated by equation (45), the common source voltage $V_S$ depends on the differential input voltage $V_x$ and is not constant. The common source voltage $V_S$ remains as a nonlinear term in equation of the differential output current ΔI' of the first cascoded quadritail cell. Therefore, the linearity of the first cascoded quadritail cell is poorer than that of the MOS four-quadrant multipliers shown in FIGS. 11 to 14.

The differential output current ΔI of the MOS four-quadrant multiplier shown in FIG. 16 is given by:

$$\begin{aligned}\Delta I &= (I_{D72}+I_{D73}+I_{D81}+I_{D84}) - (I_{D71}+I_{D74}+I_{D82}+I_{D83}) \\ &= ((I_{D72}+I_{D73})-(I_{D71}+I_{D74})) - ((I_{D82}+I_{D83})-(I_{D81}+I_{D84})) \\ &= 2\beta V_x(V_y/2+V_S-2V_{TH}) - 2\beta(-V_x)(-V_y/2+V_S'-2V_{TH}) \\ &= 2\beta V_xV_y - 2\beta V_x(V_S-V_S')\end{aligned} \qquad (53)$$

Since equations (50) and (51) are satisfied as with the circuit arrangement shown in FIG. 15, the common source voltages $V_S$, $V_S'$ can be regarded as $V_S-V_S'\approx 0$ if both the differential input voltages $V_x$, $V_y$ are small. Therefore, the input and output characteristics of the MOS four-quadrant multiplier composed of unbalanced-cascoded quadritail cells coupled as variable-gain cells to each other are multiplication characteristics with practical linearity where nonlinear terms are considerably canceled by each other.

Fourth Embodiment

Since the MOS four-quadrant multiplier according to the second embodiment employs octotail cells, it is not possible to individually establish only the sum of drain currents of four MOS transistors which are directly involved in the multiplying function. According to a fourth embodiment, two tail current sources are used for individually establishing the sum of drain currents of four MOS transistors which are directly involved in the multiplying function.

Figure 17:
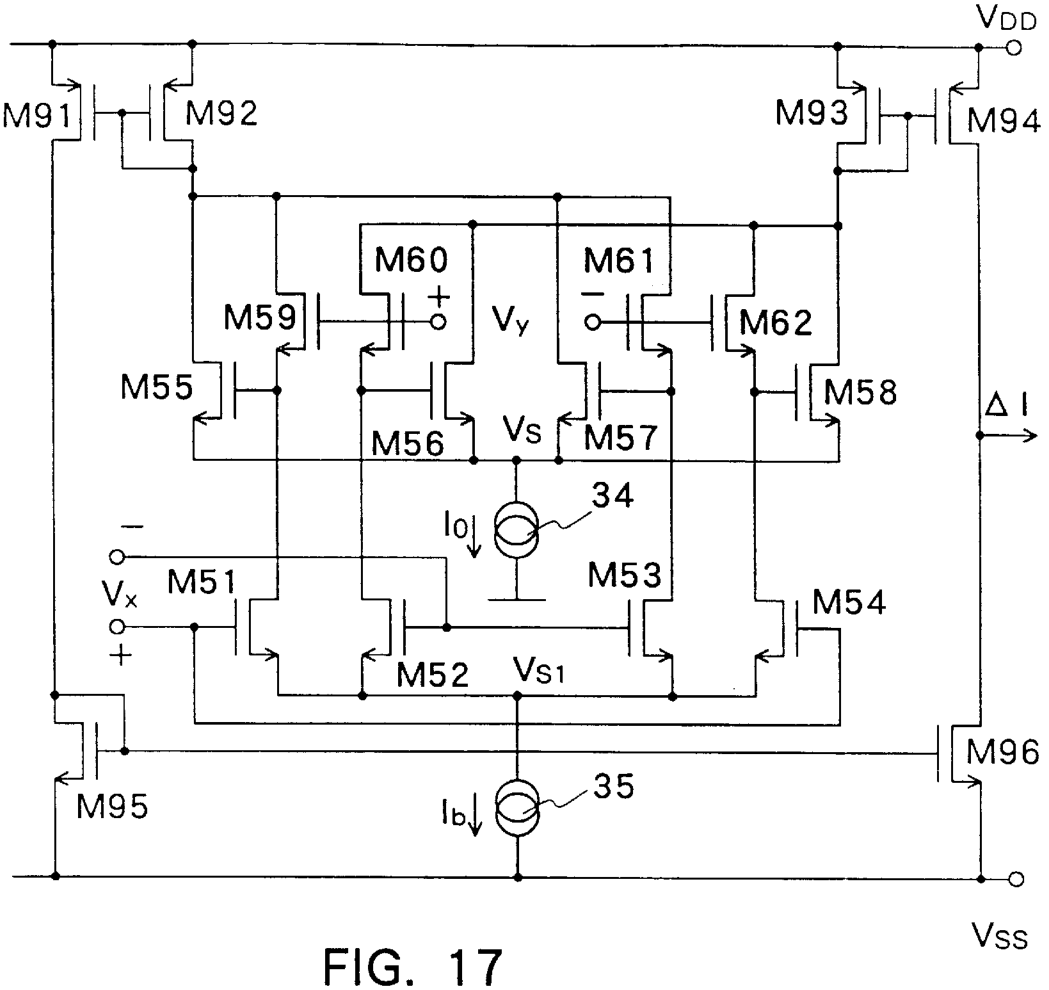
FIG. 17 is a circuit diagram of a MOS four-quadrant multiplier according to a fourth embodiment of the present invention.

A MOS four-quadrant multiplier according to the fourth embodiment shown in FIG. 17 differs from the MOS four-quadrant multiplier shown in FIG. 9 in that it has two tail current sources and three current mirrors for converting differential output currents into a single-ended output current. Specifically, MOS transistors M55 to M58 jointly serve as a multiplier core, and have sources connected in common to a first tail current source 34. MOS transistors M51 to M54 have sources connected in common to a second tail current source 35. The first and second tail current sources 34, 35 supply respective constant currents $I_o$, $I_b$. The common source voltage of transistors M55 to M58 is represented by $V_S$, and the common source voltage of transistors M51 to M54 is represented by $V_{S1}$.

The first current mirror is composed of two P-channel MOS transistors M91 and M92 having sources connected to the positive power supplies $V_{DD}$. Transistors M91 and M92 have gates connected to the drain of transistor M92, to which the drains of MOS transistors M55, M57, M59 and M61 are also connected. The second current mirror is composed of two P-channel MOS transistors M93 and M94 having sources connected to the positive power supplies $V_{DD}$. Transistors M93 and M94 have gates connected to the drain of transistor M93, to which the drains of MOS transistors M56, M58, M60 and M62 are also connected. The third current mirror is composed of two N-channel MOS transistors M95 and M96 having sources connected to the negative power supplies $V_{SS}$. Transistors M95 and M96 have gates connected to the drain of the MOS transistor M95, and drains connected respectively to the drains of transistors M91 and M94 of the first and second current mirrors. A current flowing from a node where the drains of transistors M94 and M96 are connected to each other serves as an output current of the multiplier.

The sum of and difference between the two differential input signals $V_x$, $V_y$ are applied to the multiplier core driven by the tail current $I_o$. Drain currents $I_{D55}$ to $I_{D58}$ of transistors M55 to M58 are expressed as follows:

$$I_{D55}=\beta(V_R-(V_x-V_y)/2-V_S-V_{TH})^2 (V_{GS55}>=V_{TH}) \qquad (54)$$

$$I_{D56}=\beta(V_R+(V_x+V_y)/2-V_S-V_{TH})^2 (V_{GS56}>=V_{TH}) \qquad (55)$$

$$I_{D57}=\beta(V_R-(V_x+V_y)/2-V_S-V_{TH})^2 (V_{GS57}>=V_{TH}) \qquad (56)$$

$$I_{D58}=\beta(V_R+(V_x-V_y)/2-V_S-V_{TH})^2 (V_{GS58}>=V_{TH}) \qquad (57)$$

where $V_R=V_{R2}-V_{R1}$.

From the condition of tail currents, the following relation is satisfied:

$$I_{D55}+I_{D56}+I_{D57}+I_{D58}=I_o \qquad (58)$$

From equations (54) to (58), the differential output current ΔI of the CMOS four-quadrant multiplier is determined by the following equation:

$$\Delta I = (I_{D56}+I_{D58})-(I_{D55}+I_{D57}) \qquad (59)$$

$$= \begin{cases} 2\beta V_xV_y & \left(|V_x| \leqq -\dfrac{V_y}{2} + \sqrt{\dfrac{I_o}{2\beta} - \dfrac{3}{4}V_y^2}\right) \\ \dfrac{4}{3}\beta V_xV_y - \dfrac{1}{9}\,\mathrm{sgn}(V_xV_y)\left\{3I_o + \beta(|V_x|+|V_y|)^2 - 4\beta(|V_x|+|V_y|)\sqrt{\dfrac{3I_o}{\beta} - 2(|V_x|+|V_y|)^2 + 6|V_x||V_y|}\right\} & \left(-\dfrac{|V_y|}{2} + \sqrt{\dfrac{I_o}{2\beta} - \dfrac{3}{4}V_y^2} \leqq |V_x| \leqq \dfrac{5|V_y|}{6} + \sqrt{\dfrac{I_o}{2\beta} - \dfrac{11}{36}V_y^2}\right) \\ \left(\beta V_y\sqrt{\dfrac{I_o}{\beta} - V_y^2}\right)\mathrm{sgn}(V_x) & \left(|V_x| \geqq \dfrac{5|V_y|}{6} + \sqrt{\dfrac{I_o}{2\beta} - \dfrac{11}{36}V_y^2}\right) \end{cases}$$

Figure 3:
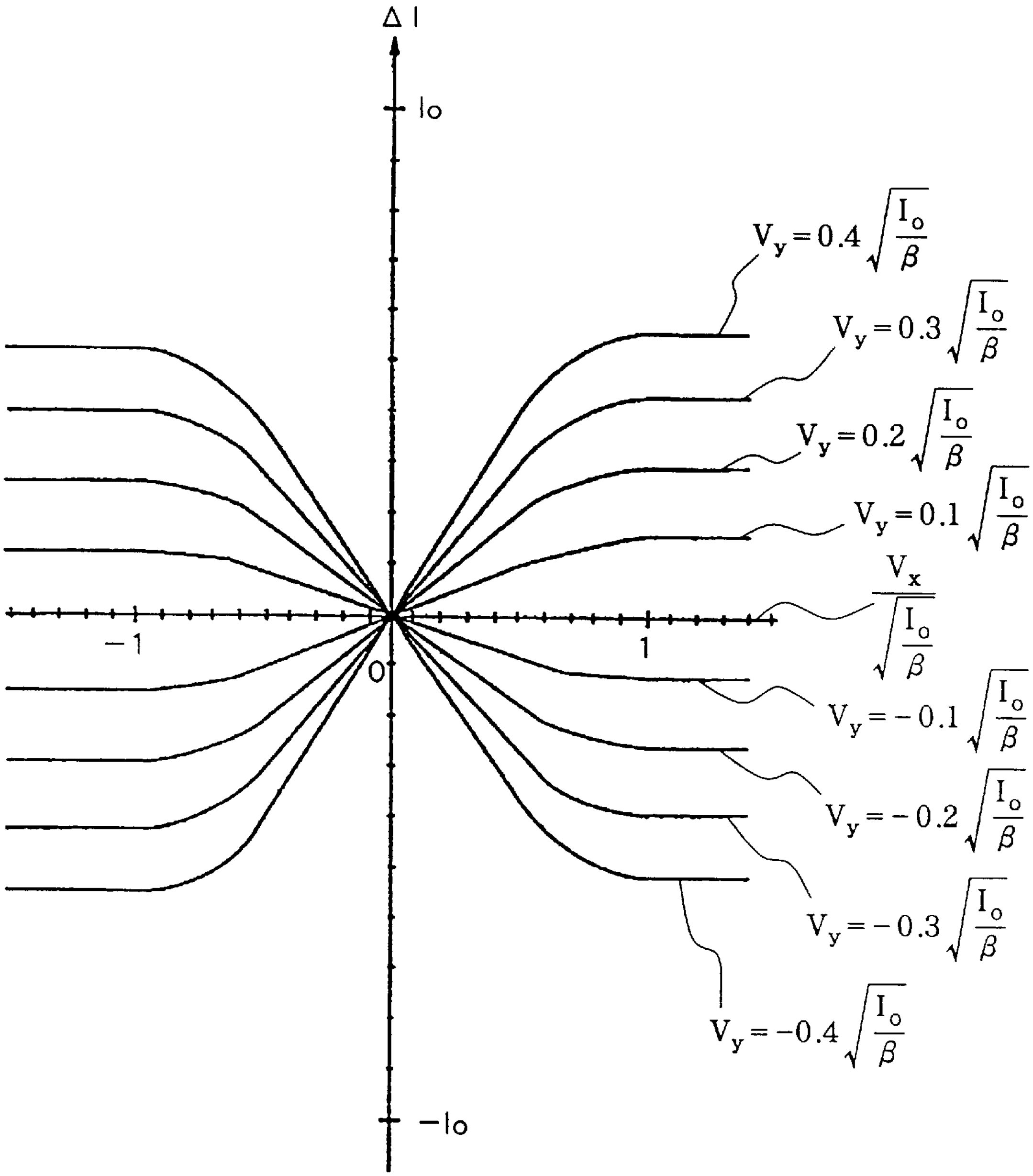
FIG. 3 (PRIOR ART)
FIG. 3 is a graph showing transfer characteristics of the conventional MOS four-quadrant multiplier shown in FIG. 2.
Figure 4:
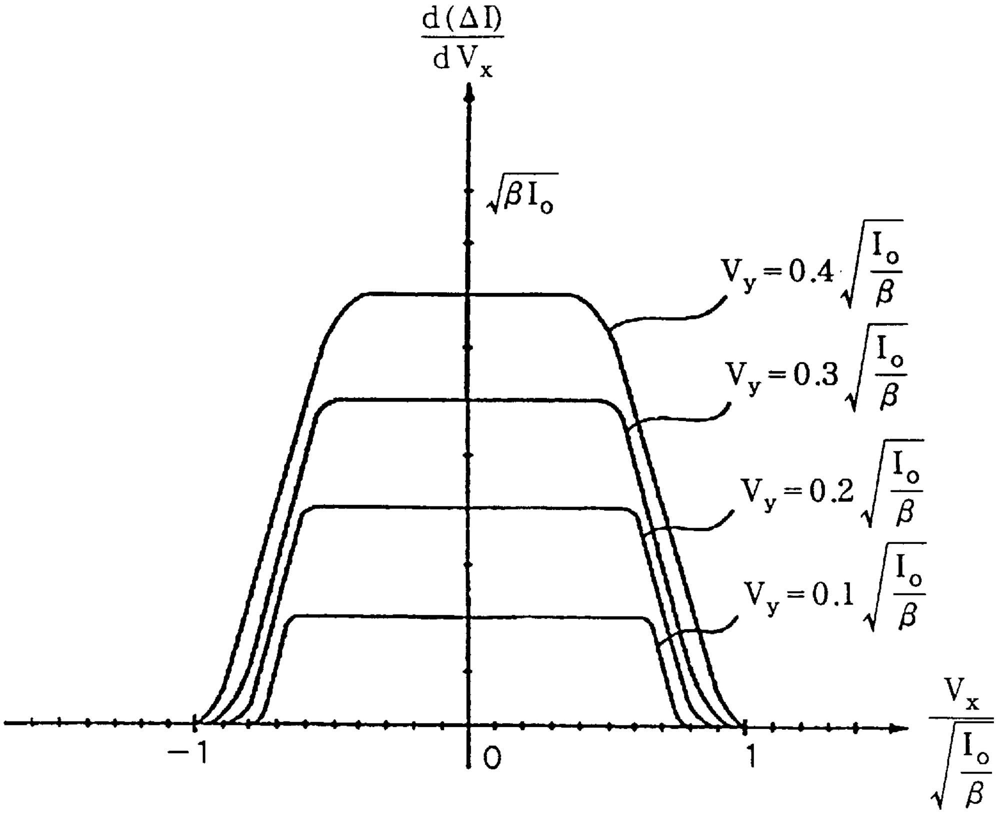
FIG. 4 (PRIOR ART)
FIG. 4 is a graph showing transconductance characteristics of the conventional MOS four-quadrant multiplier shown in FIG. 2.
Figure 5:
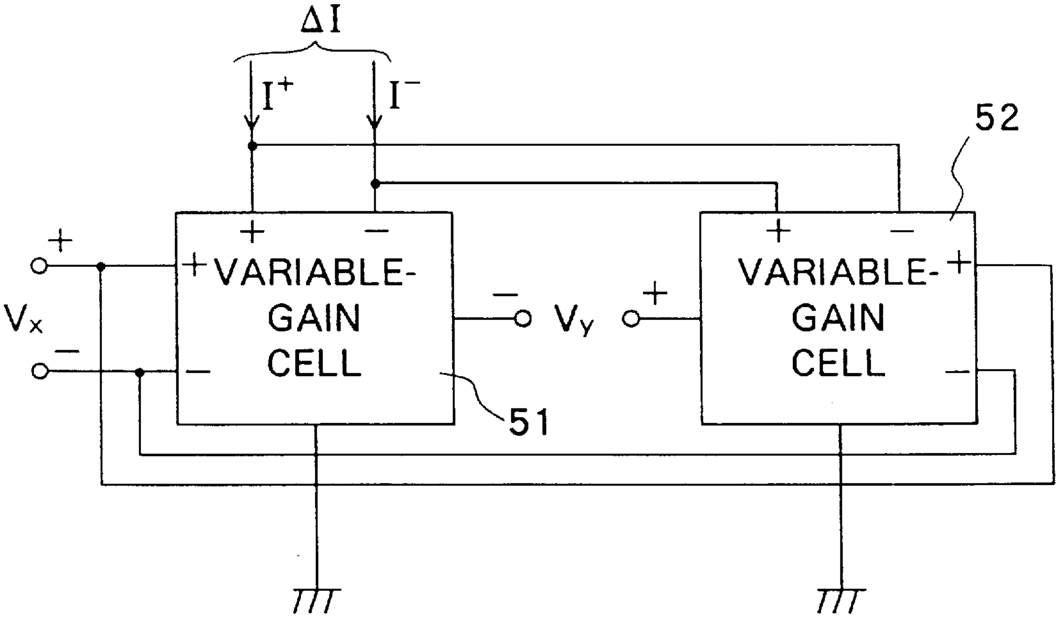
FIG. 5 (PRIOR ART)
FIG. 5 is a block diagram of a four-quadrant multiplier composed of variable-gain cells in combination.

As can be seen from equation (59), if input and output characteristics of a MOS transistor are expressed by the square-law relationships, then ideal multiplication characteristics are obtained in an input voltage range where any of the MOS transistors are not cut off. When an excessive input voltage is applied, however, since the MOS transistors are cut off, the MOS four-quadrant multiplier exhibits characteristics deviating from ideal multiplication characteristics. Since equations (59) and (13) agree with each other, the MOS four-quadrant multiplier has the same transfer characteristics as shown in FIG. 3, and has limiting characteristics with respect to large signals. The multiplier has equal transconductance characteristics with respect to either of the differential input voltages $V_x$, $V_y$. The transconductance characteristics obtained by differentiating the differential output current with respect to the first differential input voltage $V_x$ agree with the transconductance characteristics shown in FIG. 4.

Transistors M55 to M58 are driven by the same tail current $I_o$, and constitute a quadritail cell. The reasons why input voltages applied to the gates of transistors M55 to M58 of the multiplier core composed of the quadritail cell are expressed as $(\pm V_x \pm V_y)$ according to equations (54) to (57) will be described below.

An input circuit with respect to the multiplier core is a cascoded quadritail cell composed of MOS transistors M51 to M54, M59 to M62. Transistors M51 to M54 share a tail current $I_b$. The gates of transistors M51 and M54 are connected to each other, and the gates of transistors M52 and M53 are connected to each other, constituting a differential pair with respect to the first differential input voltage $V_x$. Therefore, the following equations (60), (61) are satisfied:

$$I_{D51} = I_{D54} = \begin{cases} \frac{1}{4} I_b + \frac{1}{4} \beta V_x \sqrt{\frac{2I_b}{\beta} - V_x^2} & \left( V_x \leqq \sqrt{\frac{2I_b}{\beta}} \right) \\ 0 & \left( V_x \leqq -\sqrt{\frac{2I_b}{\beta}} \right) \\ \frac{1}{2} I_b & \left( |V_x| \geqq \sqrt{\frac{2I_b}{\beta}} \right) \end{cases} \quad (60)$$

$$I_{D52} = I_{D53} = \begin{cases} \frac{1}{4} I_b + \frac{1}{4} \beta V_x \sqrt{\frac{2I_b}{\beta} - V_x^2} & \left( V_x \leqq \sqrt{\frac{2I_b}{\beta}} \right) \\ 0 & \left( V_x \leqq -\sqrt{\frac{2I_b}{\beta}} \right) \\ \frac{1}{2} I_b & \left( |V_x| \geqq \sqrt{\frac{2I_b}{\beta}} \right) \end{cases} \quad (61)$$

The same drain current flows in transistors M51 and M59, transistors M53 and M61, and transistors M54 and M62, and they have equal gate-to-source voltages. Therefore, the following equations are satisfied:

$$V_{GS51}=V_{GS54}=V_{GS59}=V_{GS62}=V_x/2+V_{R1}-V_{S1} \quad (62)$$

$$V_{GS52}=V_{GS53}=V_{GS60}=V_{GS61}=-V_x/2+V_{R1}-V_{S1} \quad (63)$$

Therefore, input voltages $V_{G55}$ to $V_{G58}$ applied to the respective gates of the four MOS transistors M55 to M58 of the multiplier core composed of the quadritail cell are determined as follows:

$$\begin{aligned} V_{G55} &= V_{R2} + V_y/2 - V_{GS59} \\ &= -V_x/2 + V_y/2 - V_{R1} + V_{R2} + V_{S1} \end{aligned} \quad (64)$$

-continued $$\begin{aligned} V_{G56} &= V_{R2} + V_y/2 - V_{GS60} \\ &= V_x/2 + V_y/2 - V_{R1} + V_{R2} + V_{S1} \end{aligned} \quad (65)$$

$$\begin{aligned} V_{G57} &= V_{R2} - V_y/2 - V_{GS61} \\ &= -V_x/2 - V_y/2 - V_{R1} + V_{R2} + V_{S1} \end{aligned} \quad (66)$$

$$\begin{aligned} V_{G58} &= V_{R2} - V_y/2 - V_{GS62} \\ &= V_x/2 - V_y/2 - V_{R1} + V_{R2} + V_{S1} \end{aligned} \quad (67)$$

Therefore, equation (59) is derived by substituting equations (64) to (67) in equations (54) to (57).

Although certain preferred embodiments of the present invention have been shown and described in detail, it should be understood that various changes and modifications may be made therein without departing from the scope of the appended claims.

What is claimed is:

1. A MOS four-quadrant multiplier for outputting a combined differential output current corresponding to a product of first and second differential input voltages, said combined differential output current including a plurality of differential output currents, said MOS four-quadrant multiplier comprising:

first and second two-quadrant multipliers each having a differential output;

each of said first and second two-quadrant multipliers having first and second pairs of transistors having sources connected in common to each other, and a third pair of transistors connected in cascode to the first pair of transistors as a load on the first pair of transistors;

said second pair of transistors of said first two-quadrant multiplier each having drains which are directly connected in common to a corresponding drain of said second pair of transistors in said second two-quadrant multiplier, said second pair of transistors having gates respectively connected to drains of said first pair of transistors and sources of said third pair of transistors in each of said first and second two-quadrant multipliers, said third pair of transistors of each of said first and second two-quadrant multipliers having gates connected in common to each other at an input voltage node in each of said first and second two-quadrant multipliers, wherein each differential output current of said plurality of differential output currents, which is generated in one of said first and second two-quadrant multipliers, comprises at least a drain current of said second pair of transistors included in said one of said first and second two-quadrant multipliers;

said differential outputs of said first and second two-quadrant multipliers being provided to supply said combined differential output current;

wherein drains of all of said third pairs of transistors of said first and second two-quadrant multipliers are directly connected in common at a first node;

wherein said first differential input voltage is applied between the gates of said first pair of transistors in each of said first and second two-quadrant multipliers; and wherein said second differential input voltage is applied between the input voltage node of said first two-quadrant multiplier and the input voltage node of said second two-quadrant multiplier.

2. A MOS four-quadrant multiplier for outputting a combined differential output current corresponding to a product of first and second differential input voltages, said combined differential output current including a plurality of differential output currents, said MOS four-quadrant multiplier comprising:

first and second two-quadrant multipliers each having a differential output;

each of said first and second two-quadrant multipliers including first and second pairs of transistors having sources connected in common to each other, and a third pair of transistors connected in cascode to the first pair of transistors as a load on the first pair of transistors;

said second pair of transistors having gates respectively connected to drains of said first pair of transistors and sources of said third lair of transistors in each of said first and second two-quadrant multipliers, said third pair of transistors of each of said first and second two-quadrant multipliers having gates connected in common to each other at a node in each of said first and second two-quadrant multipliers;

wherein a drain of a first transistor of said second pair of transistors in said first two-quadrant multiplier is directly connected in common at a first node to a drain of a first transistor of said third pair of transistors in said first two-quadrant multiplier, said first transistor of said second pair of transistors in said first two-quadrant multiplier including a gate which is directly connected in common to a source of said first transistor of said third pair of transistors in said first two-quadrant multiplier;

wherein a drain of a second transistor of said second pair of transistors in said first two-quadrant multiplier is directly connected in common at a second node to a drain of a second transistor of said third pair of transistors in said first two-quadrant multiplier, said second transistor of said second pair of transistors in said first two-quadrant multiplier including a gate which is directly connected in common to a source of said second transistor of said third pair of transistors in said first two-quadrant multiplier;

wherein a drain of a first transistor of said second pair of transistors in said second two-quadrant multiplier is directly connected at a third node to a drain of a first transistor of said third pair of transistors in said second two-quadrant multiplier, said first transistor of said second pair of transistors in said second two-quadrant multiplier including a gate which is directly connected in common to a source of said first transistor of said third pair of transistors in said second two-quadrant multiplier, said first and third nodes being directly connected in common;

wherein a drain of a second transistor of said second pair of transistors in said second two-quadrant multiplier is directly connected in common at a fourth node to a drain of a second transistor of said third pair of transistors in said second two-quadrant multiplier, said second transistor of said second pair of transistors in said second two-quadrant multiplier including a gate which is directly connected in common to a source of said second transistor of said third pair of transistors in said second two-quadrant multiplier, said second and fourth nodes being directly connected in common;

wherein each differential output current of said plurality of differential output currents, which is generated in a corresponding one of said first and second two-quadrant multipliers, comprises at least a drain current of said second pair of transistors included in said one of said first and second two-quadrant multipliers;

said differential outputs of said first and second two-quadrant multipliers forming said combined differential output current;

wherein said first differential input voltage is applied between the gates of said first pair of transistors in each of said first and second two-qauadrant multipliers; and wherein said second differential input voltage is applied between the node of said first two-qauadrant multiplier and the node of said second two-quadrant multiplier.

3. The MOS four-quadrant multiplier according to claim 1, wherein a power supply voltage is applied to the drains of the third pair of transistors in each of said first and second two-quadrant multipliers.

4. The MOS four-quadrant multiplier according to claim 1, further comprising a current mirror circuit for converting said combined differential output current into a single-ended output current.

5. A MOS four-quadrant multiplier for outputting a combined differential output current corresponding to a product of first and second differential input voltages, comprising:

first and second variable-gain cells for generating a differential output current at a gain depending on an applied tuning voltage in response to a first differential input voltage applied thereto;

each of said first and second variable-gain cells comprising a tail current source, first and second pairs of transistors having sources connected in common to each other and to said tail current source, and a third pair of transistors connected in cascade to the first pair of transistors as a load on the first pair of transistors;

said second pair of transistors having gates connected to drains of said first pair of transistors in each of said first and second variable-gain cells, said third pair of transistors in said first variable gain cell including transistors having gates which are connected in common to respective gates of the transistors of the third pair of transistors in said second variable cell at first and second nodes for applying the tuning voltage therebetween, said first pair of transistors of said first and second variable gain cells having gates for applying the first differential input voltage therebetween in each of said first and second variable-gain cells, said differential output current containing at least drain currents of the second pair of transistors;

said first and second variable-gain cells having differential outputs which are provided to supply a combined differential output current.

6. The MOS four-quadrant multiplier according to claim 5, wherein a drain of each transistor of the second pair of transistors of one of said first and second variable-gain cells is connected in common to respective drains of the second and third pairs of transistors in each of said first and second variable-gain cells.

7. The MOS four-quadrant multiplier according to claim 5, wherein a drain of each transistor of said second pair of transistors of one of said first and second variable-gain cells is directly connected in common to a respective drain of one of the transistors of said second pair of transistors in the other of said first and second variable-gain cells.

8. The MOS four-quadrant multiplier according to claim 5, wherein a power supply voltage is applied to the drains of the third pair of transistors in each of said first and second variable-gain cells.

9. The MOS four-quadrant multiplier according to claim 5, wherein the gates of the first pair of transistors are connected in common to each other and said first differential input voltage is applied between the gates of the first pair of transistors in said first and second variable-gain cells.

10. The MOS four-quadrant multiplier according to claim 5, wherein said first differential input voltage is applied between the gates of the first pair of transistors.

* * * * *